(12) United States Patent
Shibuya

(10) Patent No.: US 8,565,132 B2
(45) Date of Patent: Oct. 22, 2013

(54) WIRELESS COMMUNICATION TERMINAL

(75) Inventor: Kazuyuki Shibuya, Sagamihara (JP)

(73) Assignee: Olympus Corporation, Tokyo (JP)

( * ) Notice: Subject to any disclaimer, the term of this patent is extended or adjusted under 35 U.S.C. 154(b) by 120 days.

(21) Appl. No.: 13/247,251

(22) Filed: Sep. 28, 2011

(65) Prior Publication Data
US 2012/0106449 A1    May 3, 2012

(30) Foreign Application Priority Data

Oct. 29, 2010  (JP) ................................ 2010-243884

(51) Int. Cl.
H04B 7/00          (2006.01)
(52) U.S. Cl.
USPC ....................................................... 370/310
(58) Field of Classification Search
USPC ......... 370/241, 252, 310, 351, 389, 431, 463,
370/912–913, 229–231, 235, 236,
370/901–903; 726/2–4
See application file for complete search history.

(56) References Cited

U.S. PATENT DOCUMENTS

| | | | |
|---|---|---|---|
| 7,844,307 B2* | 11/2010 | Henson et al. ................. | 455/574 |
| 2004/0152464 A1* | 8/2004 | Sugaya ....................... | 455/435.1 |
| 2008/0225864 A1* | 9/2008 | Aissaoui et al. .............. | 370/401 |
| 2009/0019539 A1* | 1/2009 | Jonnalagadda et al. ........ | 726/14 |
| 2010/0180321 A1* | 7/2010 | Graeber et al. ................... | 726/4 |
| 2010/0254314 A1* | 10/2010 | Tsuchiya ....................... | 370/328 |
| 2011/0176546 A1* | 7/2011 | Eastham et al. ............... | 370/390 |
| 2011/0247053 A1* | 10/2011 | Pugh ................................ | 726/4 |

OTHER PUBLICATIONS

IEEE Standard for Information Technology—Telecommunications and information exchange between systems—Local and metropolitan area networks—Specific requirements, Part 11: Wireless LAN Medium Access Control (MAC) and Physical Layer (PHY) Specifications, 2007.
Wi-Fi Protected Setup Specification, Wi-Fi Allicance, Dec. 2006.

* cited by examiner

Primary Examiner — Omar Ghowrwal
(74) Attorney, Agent, or Firm — Westerman, Hattori, Daniels & Adrian, LLP

(57) ABSTRACT

A wireless communication terminal may include a recognition unit that recognizes terminals that are located in its own vicinity and that are capable of performing wireless communication, an authentication unit that performs authentication at a data link level for the recognized terminals that are capable of performing wireless communication, a communication unit that receives authentication requests from the recognized terminals that are capable of performing wireless communication, and performs data communication with the recognized terminals, a selection unit that selects any one of the recognized terminals that are capable of performing wireless communication, and an authentication control unit that, if the authentication request is received from a terminal that has not been recognized, causes the authentication unit to perform the authentication for the selected terminal, and at the same time prohibits the authentication unit from performing the authentication for terminals other than the selected terminal.

8 Claims, 23 Drawing Sheets

WIRELESS COMMUNICATION TERMINAL

BACKGROUND OF THE INVENTION

1. Field of the Invention

The present invention relates to a wireless communication terminal that, after performing authentication at a data link level with a terminal capable of performing wireless communication with its surrounding area, performs data communication with that wireless communication-capable terminal.

Priority is claimed on Japanese Patent Application No. 2010-243884, filed Oct. 29, 2010, the content of which is incorporated herein by reference:

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In a wireless LAN, when a wireless communication terminal is performing data communication within a network, it firstly participates in that network, and then performs authentication processing at the data link level with the wireless communication terminal which is going to be its direct communication partner, resulting in an encryption key being distributed. As a result, data communication between that wireless communication terminal and the communication partner wireless communication terminal is enabled.

In the case of infrastructure mode, the direct communication partner is an access point (abbreviated below to AP). When a wireless communication terminal receives a Beacon which is transmitted at regular intervals by an AP and announces the presence of the AP, Or when it receives a Probe Response, which is a response from an AP to a Probe Request, namely, to a request to acquire network information which was transmitted to the AP by that wireless communication terminal itself, then the wireless communication terminal detects the network created by the AP.

A Beacon or Probe Response includes SSID, which is network identification information, and information relating to the encryption and authentication types. A wireless communication terminal decides to participate in a network in accordance with the SSID and information relating to the encryption and authentication types. For example, if a plurality of networks are detected, then by selecting a specific SSID from among the SSID of this plurality of networks, a user can decide to participate in that network. In addition, a user can also decide not to participate in an open network that has not been authenticated.

When the Wireless communication terminal has been decided to participate in a network, the wireless communication terminal is placed in a state of participation as a result of its own TSF (timing synchronization function) timer being synchronized with the value of the TSF timer of the AP contained in the received Beacon or Probe Response. The wireless communication terminal which is in a state of participation attempts to perform authentication processing at a data link level with the AP, and if this authentication processing is successful, the wireless communication terminal is able to communicate via the AP with other wireless communication terminals that have already completed authentication processing with that AP.

In contrast, in the case of ad hoc mode, an AP is not required and other wireless communication terminals become direct communication partners. In this case, when a wireless communication terminal detects a network created by another wireless communication terminal, then in the same process as when it detects a network created by an AP, the wireless communication terminal enters a state of participation in that network. Generally, authentication processing operation of this type is performed.

In order for a particular wireless communication terminal to participate in a network and complete authentication processing, it is necessary to set up a variety of information (i.e., network setting information) in the wireless communication terminal such as the network ID (SSID), the authentication type, the encryption type, and the encryption key. This has generally required operating input from a user on the wireless communication terminal. Because this operating input is complex, performing the setup operation has proved difficult, particularly for users who are unfamiliar with wireless LAN technology. In contrast, Wi-Fi Protected Setup (TM) Specification 1.0 (referred to below as WPS) has been disclosed as a wireless LAN industry-wide standard technology that allows this setup to be performed simply and enables a wireless communication terminal to participate in an infrastructure network.

In WPS, for example, as a result of a user pressing buttons in both an AP and a wireless communication terminal, or alternatively, as a result of a user entering a PIN code displayed on one of the AP and the wireless communication terminal into the other one thereof, the network setting information held by the AP can be safely transferred to the wireless communication terminal. After the delivery of the various information by WPS has ended, the wireless communication terminal completes the authentication processing between itself and the AP based on the delivered information, and is able to perform data communication with the AP.

In the case of the ad hoc mode, a wireless communication terminal that is starting a new participation in a network (abbreviated below to 'new wireless communication terminal') performs authentication processing with all of the existing wireless communication terminals within the network. As a consequence, even if a new wireless communication terminal intends to communicate solely with a specific wireless communication terminal within the network, and does not wish to communicate with wireless communication terminals other than that specific terminal, authentication is established at the data link level between the new wireless communication terminal and all of the existing wireless communication terminals within the network, and data communication between these is enabled. For example, a case might be considered in which a printer and PC are present, in an existing ad hoc network, and a user who owns a digital still camera (abbreviated below to DSC) participates in this ad hoc network with the aim of printing on the printer an image stored on the DSC. In this case, the fact that data communication between the DSC and the PC is now possible means that there is a possibility of unnecessary data communication occurring, and this may cause problems from the standpoint of network resources. Furthermore, if the user of the DSC is not an acquaintance of the user of the PC, then problems may also occur from the standpoints of security and privacy.

Moreover, if a case in which a WPS is expanded to ad hoc mode is considered, then when a user is implementing WPS by pressing buttons on both a wireless communication terminal that is participating in an ad hoc network and a new wireless communication terminal, the intention of the user to perform data communication between the devices whose buttons have been pressed is obvious. However, for the user of a new wireless communication terminal, the fact that they may now also perform data communication with other wireless communication terminals may give rise to the problems described above. Because of this, it is desirable for a new wireless communication terminal to perform authentication processing at the data link level with only a limited number of the wireless communication terminals existing within a network, and to then perform data communication.

SUMMARY

The present invention provides a wireless communication terminal that is able to perform data communication exclusively with a limited number of wireless communication terminals that it has itself selected.

A wireless communication terminal may include: a recognition unit that recognizes terminals that are located in its own vicinity and that are capable of performing wireless communication an authentication unit that performs authentication at a data link level for the recognized terminals that are capable of performing wireless communication; a communication unit that receives authentication requests from the recognized terminals that are capable of performing wireless communication, and performs data communication with the recognized terminals; a selection unit that selects any one of the recognized terminals that are capable of performing wireless communication; and an authentication control unit that, if the authentication request is received from a terminal that has not been recognized, causes the authentication unit to perform the authentication for the selected terminal, and at the same time prohibits the authentication unit from performing the authentication for terminals other than the selected terminal.

The wireless communication terminal may further include: a storage unit that stores first identification information that identifies terminals, which have not been authenticated, from among the recognized terminals that are capable of performing wireless communication. If the authentication request is received from a terminal that is located in the vicinity of the authentication control unit and that is capable of performing wireless communication, and the authentication request includes second identification information about the terminal, then the authentication control unit may determine whether or not the terminal has been authenticated based on the first identification information and on the second identification information as well. If it is determined that the terminal has not been authenticated, then the selection unit may select the terminal.

The communication unit may also transmit notification information that notifies terminals, which are located in its vicinity and which are capable of performing wireless communication, about the fact that functions of the authentication control unit are valid.

The communication unit may receive from the terminal, which includes the authentication control unit and which is capable of performing wireless communication, information notifying the communication unit about the fact that functions of the authentication control unit are valid. If the communication unit receives the notification information, then the communication unit may make the functions of the authentication control unit valid.

If a command is input to select one of the terminals, which has not been authenticated, from among the recognized terminals that are capable of performing wireless communication, then the communication unit may also transmit the authentication request to the terminal.

If the authentication request is received from a terminal, which has not been authenticated, from among the recognized terminals that are capable of performing wireless communication, then the communication unit may use a WPS protocol to transmit to the terminal connection setting information that is required for the authentication, or to receive from the terminal connection setting information that is required for the authentication.

According to the present invention, when an authentication request is made from a terminal which is capable of wireless communication but which has not yet been authenticated, then when the authentication unit performs the authentication, by performing the authentication for the terminal which has been selected by the selection unit, and prohibiting authentication for terminals other than the selected terminal, authentication at the data link level is performed only with the selected terminal. As a result, a user is able to perform data communication exclusively with a limited number of wireless communication terminals which are selected by that user.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
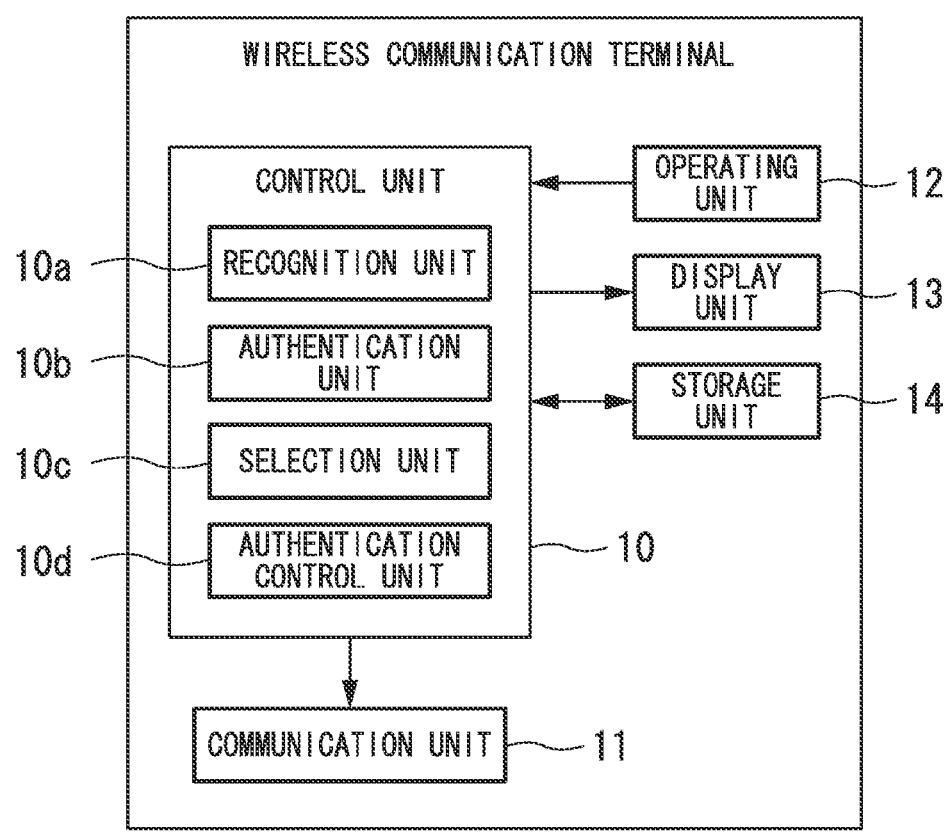
FIG. 1 is a block diagram showing the structure of a wireless communication terminal according to a first preferred embodiment of the present invention.

Firstly, a first preferred embodiment of the present invention will be described. FIG. 1 shows the structure of a wireless communication terminal (i.e., of the wireless communication terminals 1-3 described below) according to the present preferred embodiment. The wireless communication terminal shown in FIG. 1 has a control unit 10, a communication unit 11, an operating unit 12, a display unit 13, and a storage unit 14.

The control unit 10 controls each unit within the wireless communication. terminal. In addition, the control unit 10 has a recognition unit 10a, an authentication unit 10b, a selection unit 10c, and an authentication control unit 10d that serve as the functional structure for authenticating the data link level.

When the recognition unit 10a receives a Beacon announcing the presence of a wireless communication terminal, or when the recognition unit 10a receives a Probe Request which, in an ad hoc network, also signifies a participation request to the network, or when the recognition unit 10a receives a Probe Response which is a response to a Probe Request, it recognizes wireless communication terminals that are located in its own vicinity based on the received Beacon, Probe Request, or a Probe Response. The authentication unit 10b authenticates the data link levels of wireless communication terminals that have been recognized. When a Beacon, Probe Request, or Probe Response (authentication request) which includes information showing that setup processing is currently being performed is received from a wireless communication terminal that has not been authenticated, the selection unit 10c selects the terminal which is the source of that transmission. The authentication control unit 10d controls the authentication unit 10b when it is performing authentication such that it performs authentication for terminals selected by the selection unit 10c, and such that authentication is prohibited for terminals other than the selected terminals.

The communication unit 11 performs data communication by wireless with wireless communication terminals that have been authenticated, and also performs wireless communication of network setting information (i.e., connection setting information) and the like. The operating unit 12 has buttons and the like that a user uses for operation inputs, and outputs the results of these operation inputs to the control unit 10. The display unit 13 displays various types of information. The storage unit 14 stores various types of information that are used for processing within the wireless communication terminal.

FIGS. 2A through 2E show examples of a schematic operation when the authentication of a terminal is performed using WPS. The schematic operation of a wireless communication terminal will now be described while referring to FIGS. 2A through 2E.

Figure 2A:
FIGS. 2A to 2E are views showing the schematic operation of the wireless communication terminal according to the first preferred embodiment of the present invention.

In FIG. 2A, in a wireless communication terminal 1 and a wireless communication terminal 2 of which neither belongs to an ad hoc network, a setup start trigger (here, pressing a button based on a WPS PBC method) is generated in each one. In WPS, a PIN method may also be used and, in that case, the setup start trigger is the activating of a setup application (i.e., by a user operating the operating unit 12 so as to activate an application, or by the application being activated automatically after the power switch of a wireless communication terminal has been turned on).

Figure 2B:
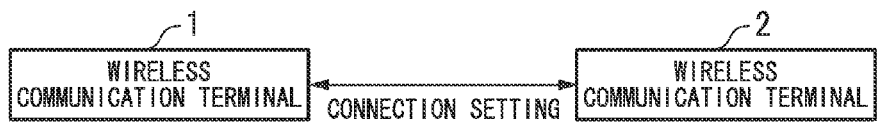

In FIG. 2B, connection setting is commenced in order for wireless communication to be performed between wireless communication terminals whose setup start triggers have been generated. The connection setting in this case is implemented by means of WPS which is able to operate in an ad hoc network environment.

Figure 2C:
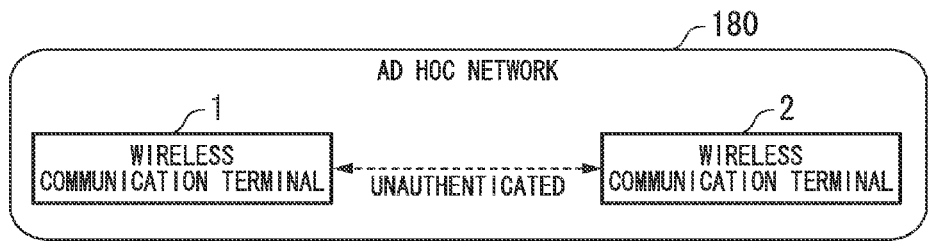

In FIG. 2C, when the connection setting has been completed in both the wireless communication terminals 1 and 2, the wireless communication terminal 1 and the wireless communication terminal 2 participate in an ad hoc network 180 using the results of their respective connection settings. At this point, the authentication processing has not yet been implemented for the two wireless communication terminals, and they are not able to perform data communication.

Figure 2D:
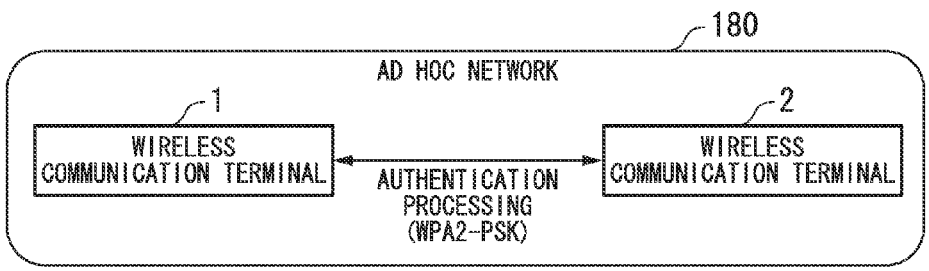

In FIG. 2D, because mutual setup start triggers have been generated in both the wireless communication terminal 1 and the wireless communication terminal 2, authentication processing is implemented following on from the connection setting. In the preferred embodiments of the present invention, a WPA2-PSK mode is illustrated as an authentication type, however, a WPA-PSK may also be used for the authentication type. Alternatively, it is also possible hereto use a WPA or WPA2 Enterprise by utilizing an authentication server (not shown).

Figure 2E:
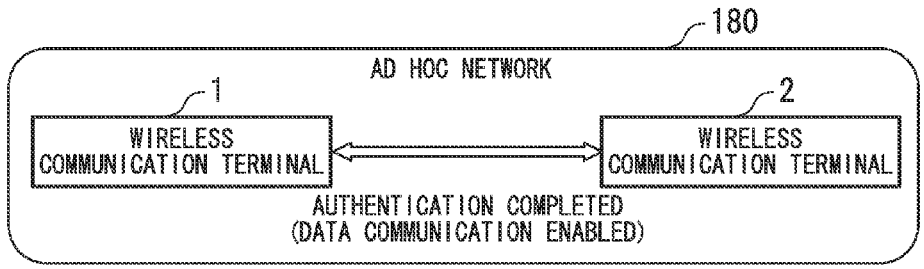

In FIG. 2E, when the authentication processing has been completed, authentication between the wireless communication terminal 1 and the wireless communication terminal 2 is complete, and data communication is enabled.

FIGS. 3A through 3E show other examples of the schematic operation when the authentication of terminals is performed using WPS. The schematic operation of a wireless communication terminal will now be described while referring to FIGS. 3A through 3E.

Figure 3A:
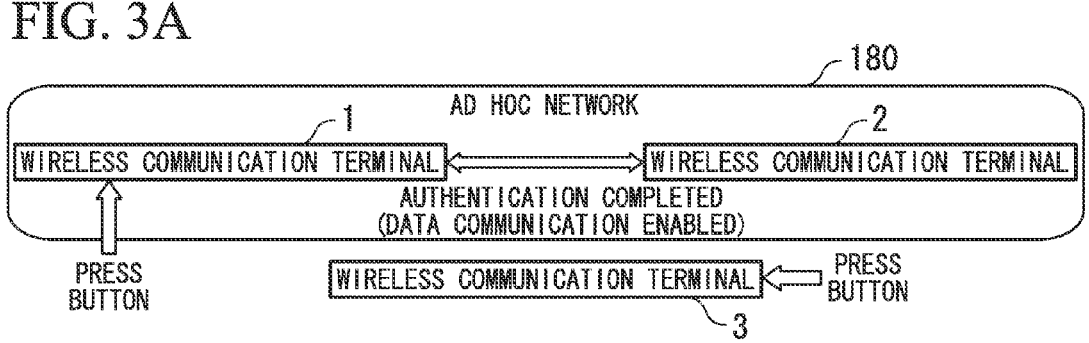
FIGS. 3A to 3E are views showing the schematic operation of the wireless communication terminal according to the first preferred embodiment of the present invention.

In FIG. 3A, from the state shown in FIG. 2E, in order for a further wireless communication terminal 3 to participate in the ad hoc network 180 and perform data communication, setup start triggers (i.e., button pressing) are generated in the wireless communication terminal 1 which has already participated in the ad hoc network 180 and in the wireless communication terminal 3 which is not participating in the ad hoc network 180.

Figure 3B:
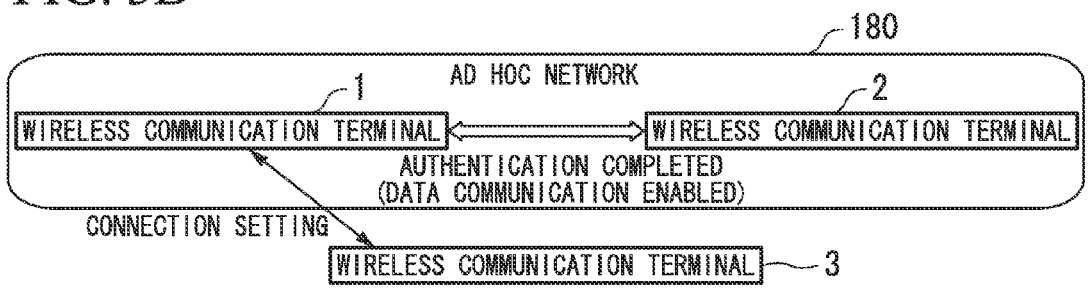

In FIG. 3B, connection setting is commenced in order for wireless communication to be performed between wireless communication terminals whose setup start triggers have been generated. The connection setting in this case is implemented by means of WPS which is able to operate in an ad hoc network environment.

Figure 3C:
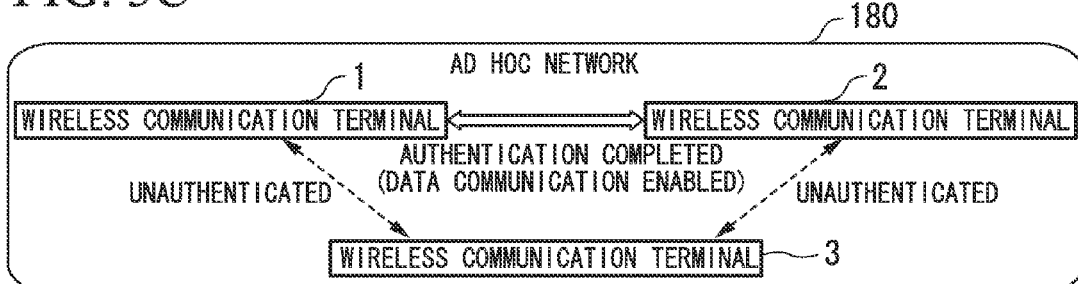

In FIG. 3C, when the connection setting has been completed between the wireless communication terminal 1 and the wireless communication terminal 3, the wireless communication terminal 3 participates in the ad hoc network 180 using the result of its connection setting. At this point, the wireless communication terminal 3 has not yet implemented authentication processing to perform data communication with all of the wireless communication terminals within the ad hoc network 180, so that it is not yet able to perform data communication.

Figure 3D:
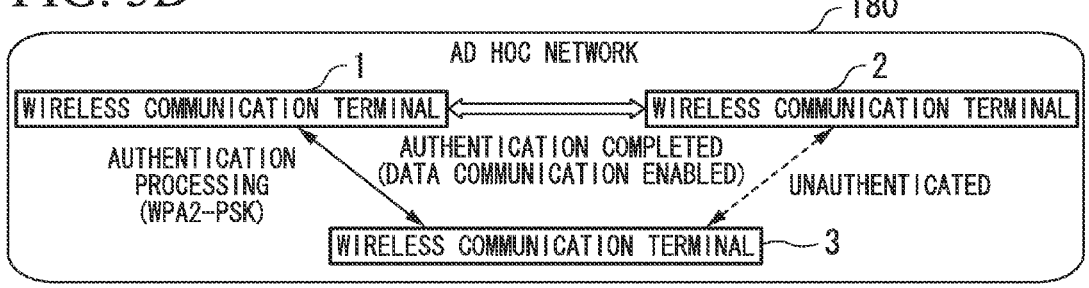

In FIG. 3D, because mutual setup start triggers have been generated in both the wireless communication terminal 1 and the wireless communication terminal 3, authentication processing is implemented following on from the connection setting.

Figure 3E:
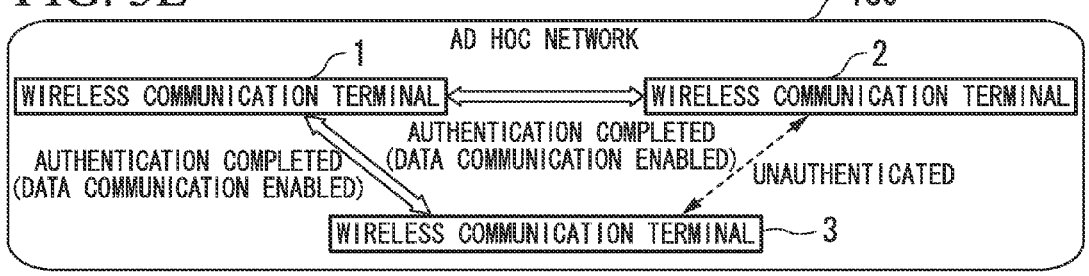

In FIG. 3E, when the authentication processing has been completed between the wireless communication terminal 1 and the wireless communication terminal 3, mutual authentication is completed between the wireless communication terminals, and data communication is enabled. In contrast, because authentication processing has not yet been implemented between the wireless communication terminal 2 and the wireless communication terminal 3, data communication between them is still not possible.

FIGS. 4A through 4E show other examples of the schematic operation when the authentication of terminals is performed using WPS. The schematic operation of a wireless communication terminal will now be described while referring to FIGS. 4A through 4E.

Figure 4A:
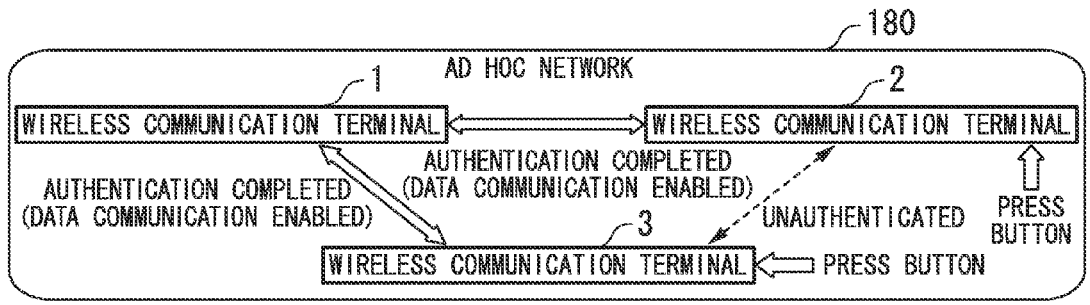
FIGS. 4A to 4C are views showing the schematic operation of the wireless communication terminal according to the first preferred embodiment of the present invention.

In FIG. 4A, from the state shown in FIG. 3E, in order for the wireless communication terminal 3 to perform data communication with the wireless communication terminal 2, setup start triggers (i.e., button pressing) are generated in the wireless communication terminal 2 and in the wireless communication terminal 3 which have both already participated in the same ad hoc network 180.

Figure 4B:
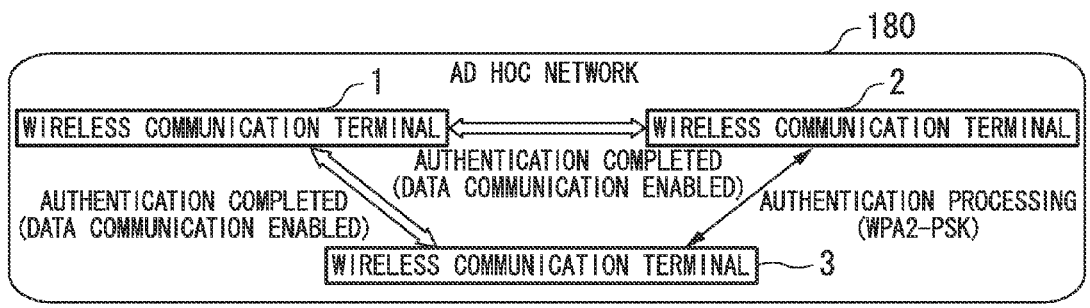

In FIG. 4B, if setup start triggers are generated between wireless communication terminals which are participating in the same ad hoc network 180, then the authentication processing is implemented without the connection setting being started.

Figure 4C:
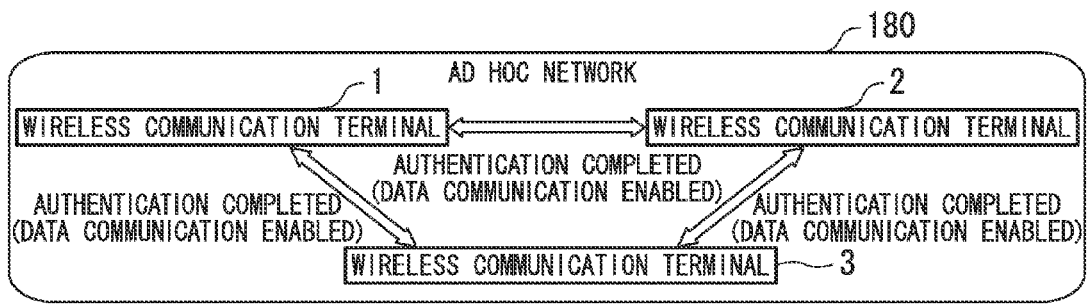

In FIG. 4C, when the authentication processing has been completed between the wireless communication terminal 2 and the wireless communication terminal 3, mutual authentication is completed between the wireless communication terminals, and data communication is enabled.

Figure 9:
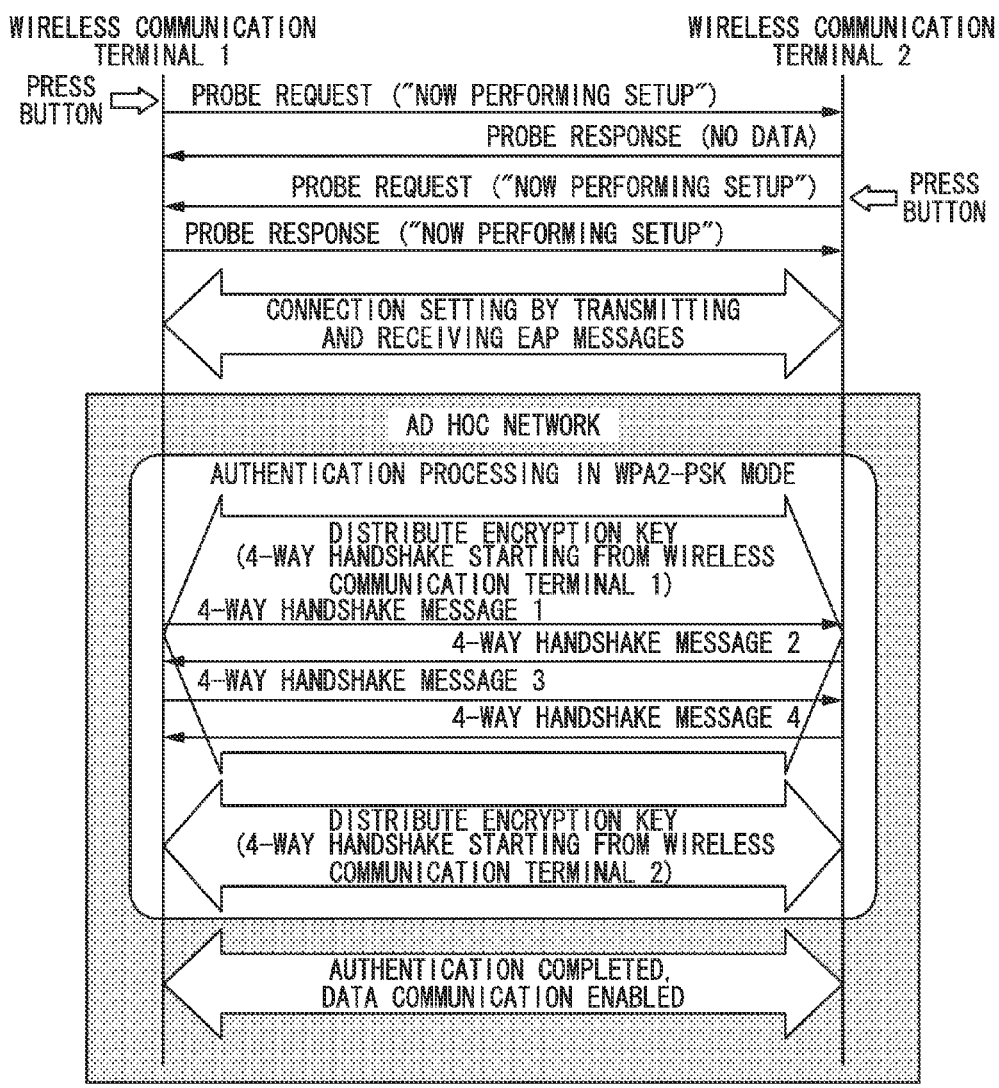
FIG. 9 is a sequence showing a communication procedure between wireless communication terminals according to the first preferred embodiment of the present invention.
Figure 10:
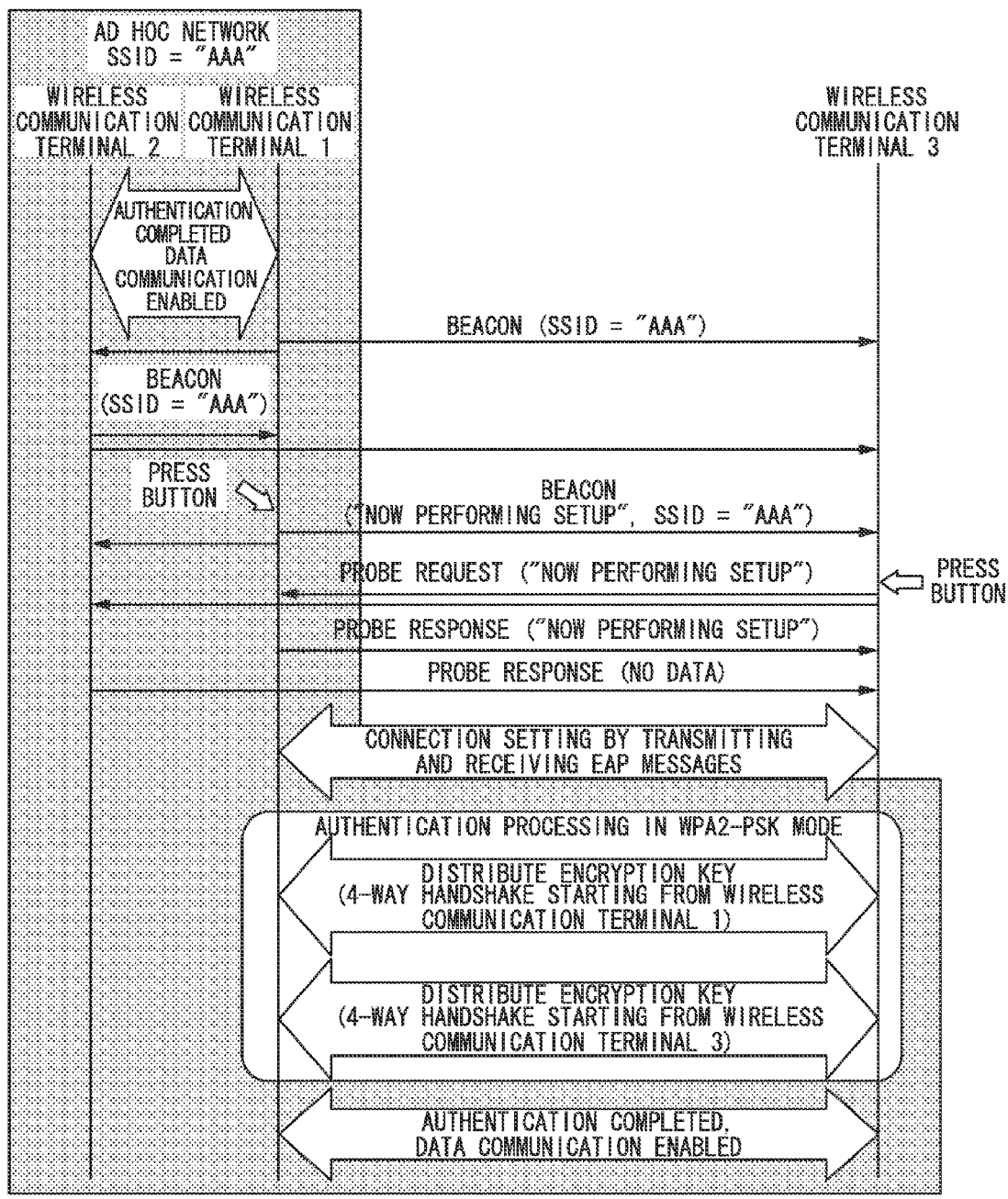
FIG. 10 is a sequence showing a communication procedure between wireless communication terminals according to the first preferred embodiment of the present invention.
Figure 11:
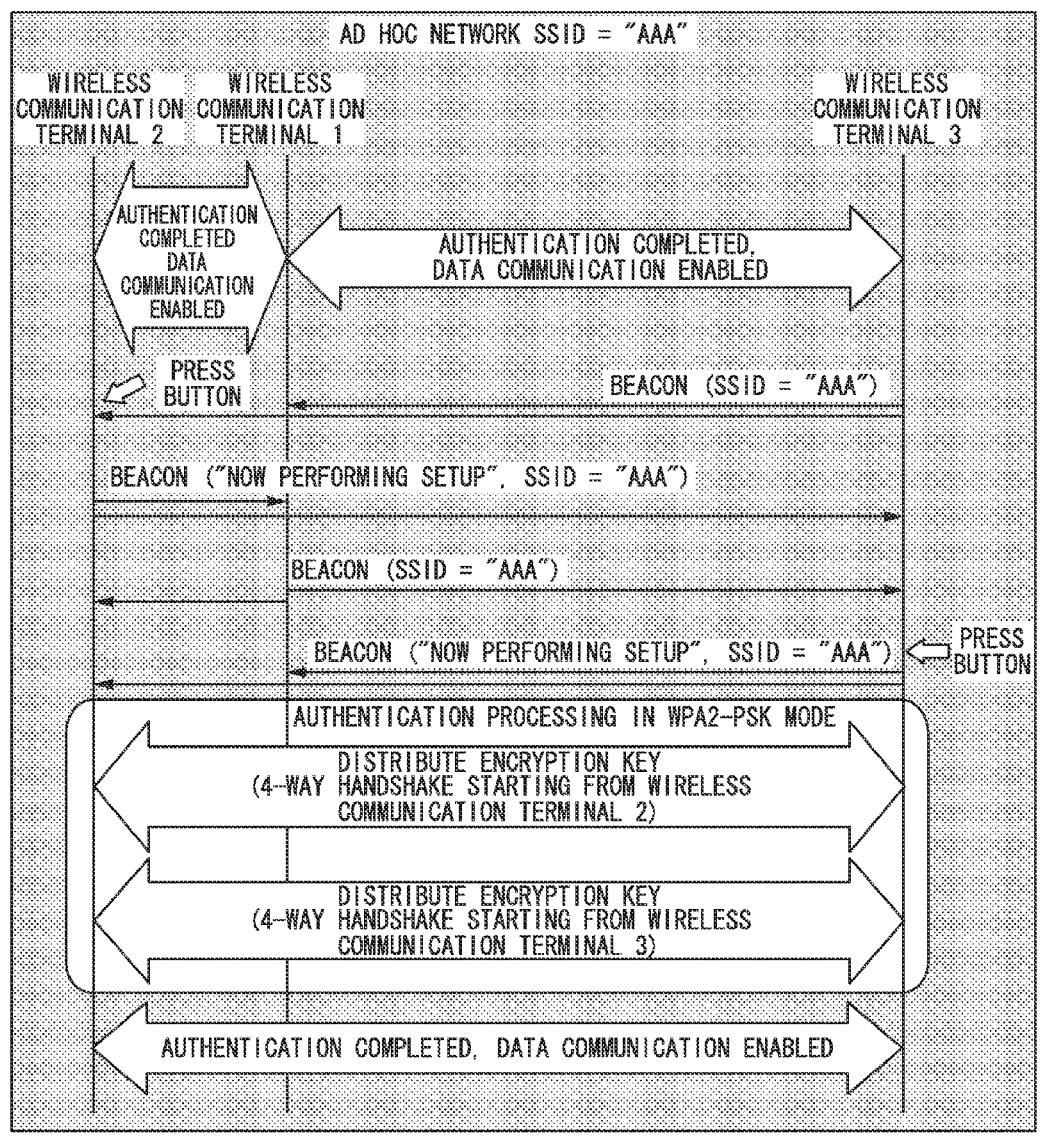
FIG. 11 is a sequence showing a communication procedure between wireless communication terminals according to the first preferred embodiment of the present invention.

Next, detailed operations of the wireless communication terminal will be described with reference made to FIG. 5 through FIG. 11. FIG. 5 through FIG. 8 show in detail the processing sequence of a wireless communication terminal. FIG. 9 through FIG. 11 show specific examples of operations in accordance with FIG. 5 through FIG. 8. By referring to FIG. 5 through FIG. 8 after referring to FIG. 9 through FIG. 11, a more complete understanding of the operations of FIG. 5 through FIG. 8 may be obtained.

Figure 5:
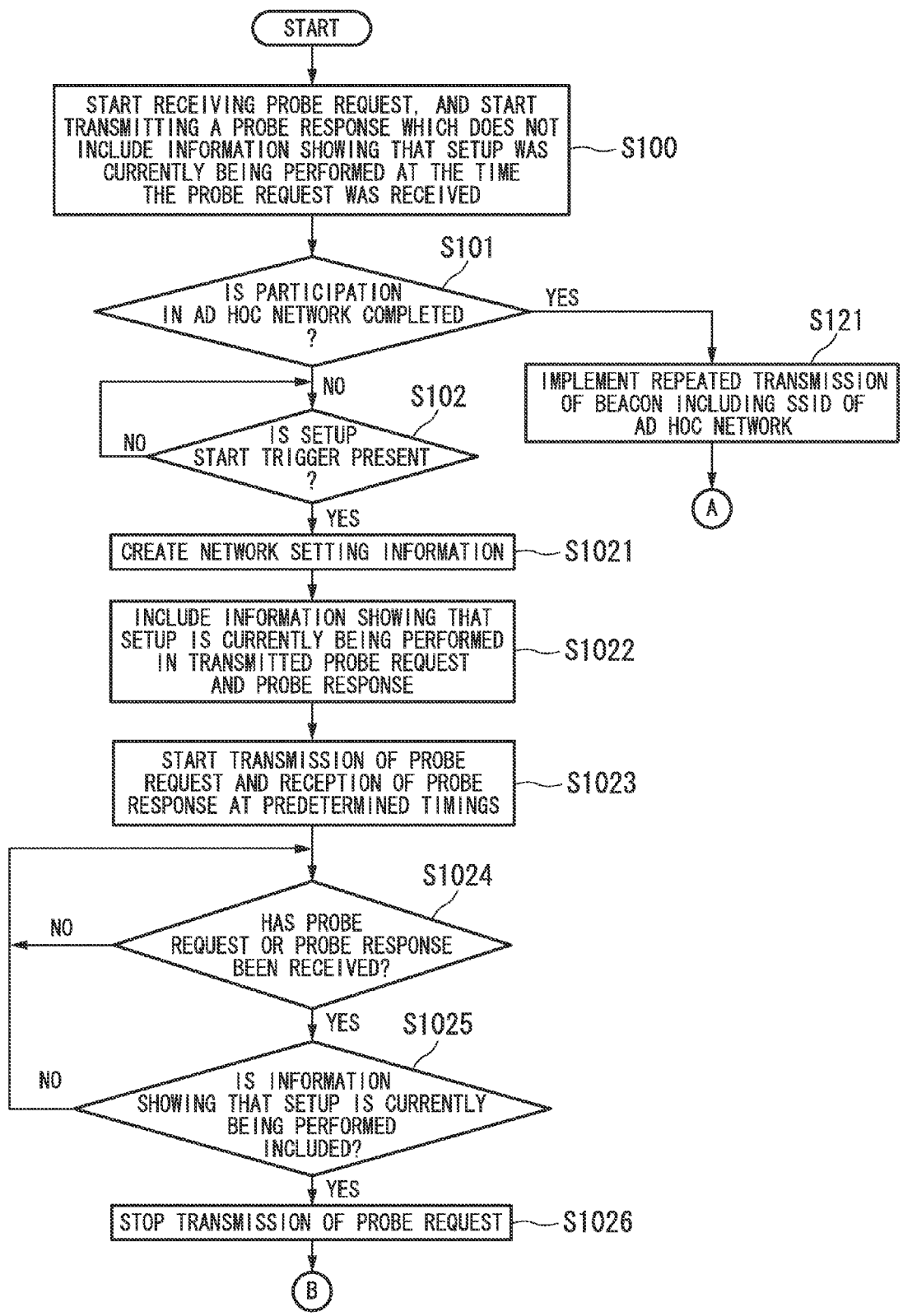
FIG. 5 is a flowchart showing a processing sequence of the wireless communication terminal according to the first preferred embodiment of the present invention.
Figure 6:
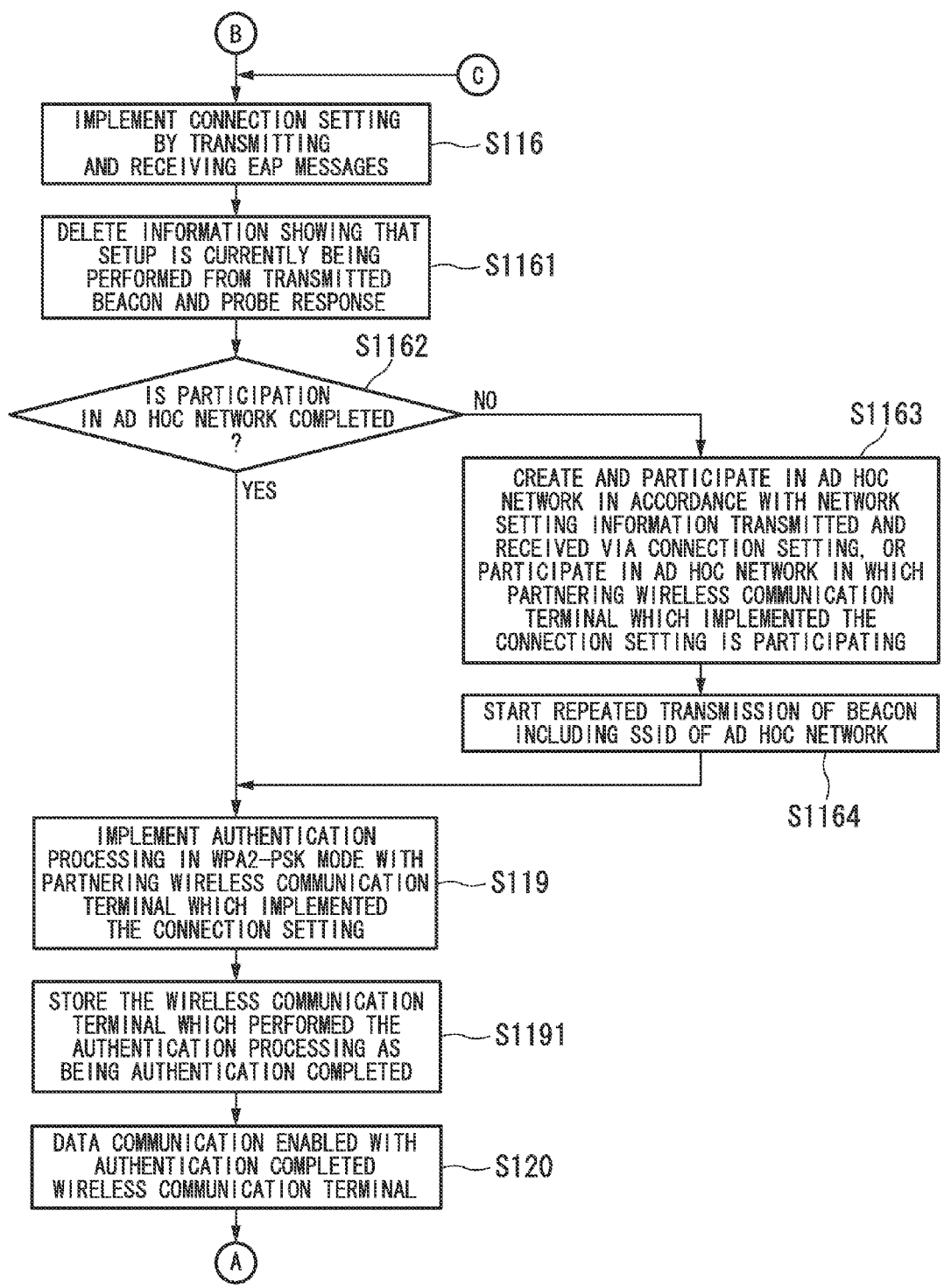
FIG. 6 is a flowchart showing a processing sequence of the wireless communication terminal according to the first preferred embodiment of the present invention.

FIG. 5 and FIG. 6 show operations of wireless communication terminals (i.e., the wireless communication terminal 1 and the wireless communication terminal 2 shown in FIG. 2, and the wireless communication terminal 3 shown in FIG. 3) that are not participating principally in an ad hoc network. The authentication control unit 10d controls the communication unit 11 such that it starts receiving Probe Requests from other wireless communication terminals, and such that, when a Probe Request is received, it starts transmitting a Probe Response which does not include information showing that setup is currently being performed (step S100).

Next, the authentication control unit 10d determines whether or not its own wireless communication terminal has completed participation in an ad hoc network (step S101). The authentication control unit 10d makes the determination of step S101 based on the wireless communication terminal's own internal state. If network setting information is stored in the storage unit 14 and the wireless communication terminal's own TSF Timer is in synchronization with the TSF timer of the network which corresponds to that network setting information, then it is determined that network participation is completed, while if it is not in synchronization, it is determined that network participation is not completed.

If the wireless communication terminal to which that authentication control unit 10d belongs has not completed participation in the ad hoc network, then that authentication control unit 10d determines whether or not a setup start trigger has been generated (step S102). If a setup start trigger has not been generated, the determination of step S102 is made once again. If a setup start trigger has been generated, the authentication control unit 10d creates network setting information which it then stores in the storage unit 14 (step S1021).

Next, the authentication control unit 10d modifies the settings of the wireless communication terminal such that 'now performing setup' information is included in Probe Requests and Probe Responses to be subsequently transmitted (step S1022). Next, the authentication control unit 10d controls the communication unit 11 such that it begins operations to transmit Probe Requests at predetermined timings and operations to receive Probe Responses. (step S1023).

Next, the authentication control unit 10d determines whether or not a Probe Request or a Probe Response has been received from another wireless communication terminal (step S1024). If a Probe Request or a Probe Response has not been received, the determination of step S1024 is repeated.

If a Probe Request or a Probe Response has been received, the recognition unit 10a identifies from the received Probe Request or Probe Response the MAC address (i.e., identification information) of the wireless communication terminal which is the transmission source, and stores it in the storage unit 14. Furthermore, the authentication control unit 10d determines whether or not information showing that setup is currently being performed is included in the received Probe Request or Probe Response (step S1025). If information showing that setup is currently being performed is not included in the received Probe Request or Probe Response, the determination of step S1024 is performed.

If information showing that setup is currently being performed is included in the received Probe Request or Probe Response, the authentication control unit 10d controls the communication unit 11 such that it suspends (i.e., stops) transmission of the Probe Request (step S1026). Next, the authentication control unit 10d controls the communication unit 11 such that it performs connection setting by means of exchanging EAP messages with the wireless communication terminal which is the source of the Probe Request or Probe Response transmission (step S116). The network setting information received via the connection setting is stored in the storage unit 14. In addition, a flag showing that the connection setting has been completed is attached to those MAC addresses, stored in the storage unit 14, of communication partner wireless communication terminals that have implemented connection setting.

After connection setting has been implemented, the authentication control unit 10*d* alters the setting of the wireless communication terminal such that the information showing that setup is currently being performed is deleted from (i.e., such that the information showing that setup is currently being performed is no longer included in) any Beacon and Probe Response that are subsequently transmitted (step S1161). Next, the authentication control unit 10*d* determines whether its own wireless communication terminal has completed the participation in an ad hoc network (step S1162). The method used for the determination in step S1162 is the same as the method used for the determination in step S101.

If its own wireless communication terminal has completed the participation in an ad hoc network, the processing moves to step S119. If, however, its own wireless communication terminal has not completed the participation in an ad hoc network, the authentication control unit 10*d* creates an ad hoc network based on network setting information received in the connection setting, and participates in the created ad hoc network. Alternatively, it participates in an ad hoc network in which the communication partner wireless communication terminal that has already implemented connection setting is participating (step S1163).

Whether to participate in an ad hoc network created by its own wireless communication terminal, or whether to participate in an ad hoc network in which the partnering wireless communication terminal that has already implemented connection setting is participating is decided at the time of the connection setting in step S116. A wireless communication terminal completes participation in an ad hoc network in which its communication partner wireless communication terminal which has already implemented connection setting is participating by synchronizing its own TSF timer with the value of the TSF timer included in the received Beacon or Probe Response. Next, the authentication control unit 10*d* reads from the storage unit 14 the SSID of the ad hoc network in which it participated in step S1163, and controls the communication unit 11 such that it starts transmitting a Beacon that includes this SSID (step S1164).

Next, the authentication control unit 10*d* controls the authentication unit 10*b* such that it performs authentication processing in WPA2-PSK with the communication partner wireless communication terminal which has already implemented the connection setting (step S119). As a result of this, the authentication unit 10*b* performs authentication processing via the communication unit 11 with the communication partner wireless communication terminal. At this time, the selection unit 10*c* reads from the storage unit 14 the MAC address of the communication partner wireless communication terminal that has already implemented the connection processing, and the authentication control unit 10*d* only performs authentication processing with the wireless communication terminal that has this read MAC address, and controls the authentication unit 10*b* such that authentication processing with any other wireless communication terminals is prohibited.

Next, the authentication control unit 10*d* stores the MAC address of the other wireless communication terminal that has already performed the authentication processing in the storage unit 14 together with a flag showing that authentication has been completed (step S1191). Next, the authentication control unit 10*d* causes the communication unit 11 to wait on standby in order for data communication to be performed (step S120). Subsequently, the communication unit 11 performs data communication as this becomes necessary. The routine then moves to step S122.

If, on the other hand, in step S101, it is determined that its own wireless communication terminal has completed participation in an ad hoc network, the authentication control unit 10*d* reads the SSID of that ad hoc network from the storage unit 14, and controls the communication unit 11 such that it repeatedly transmits a Beacon that includes that SSID (step S121). The routine then moves to step S122.

Figure 7:
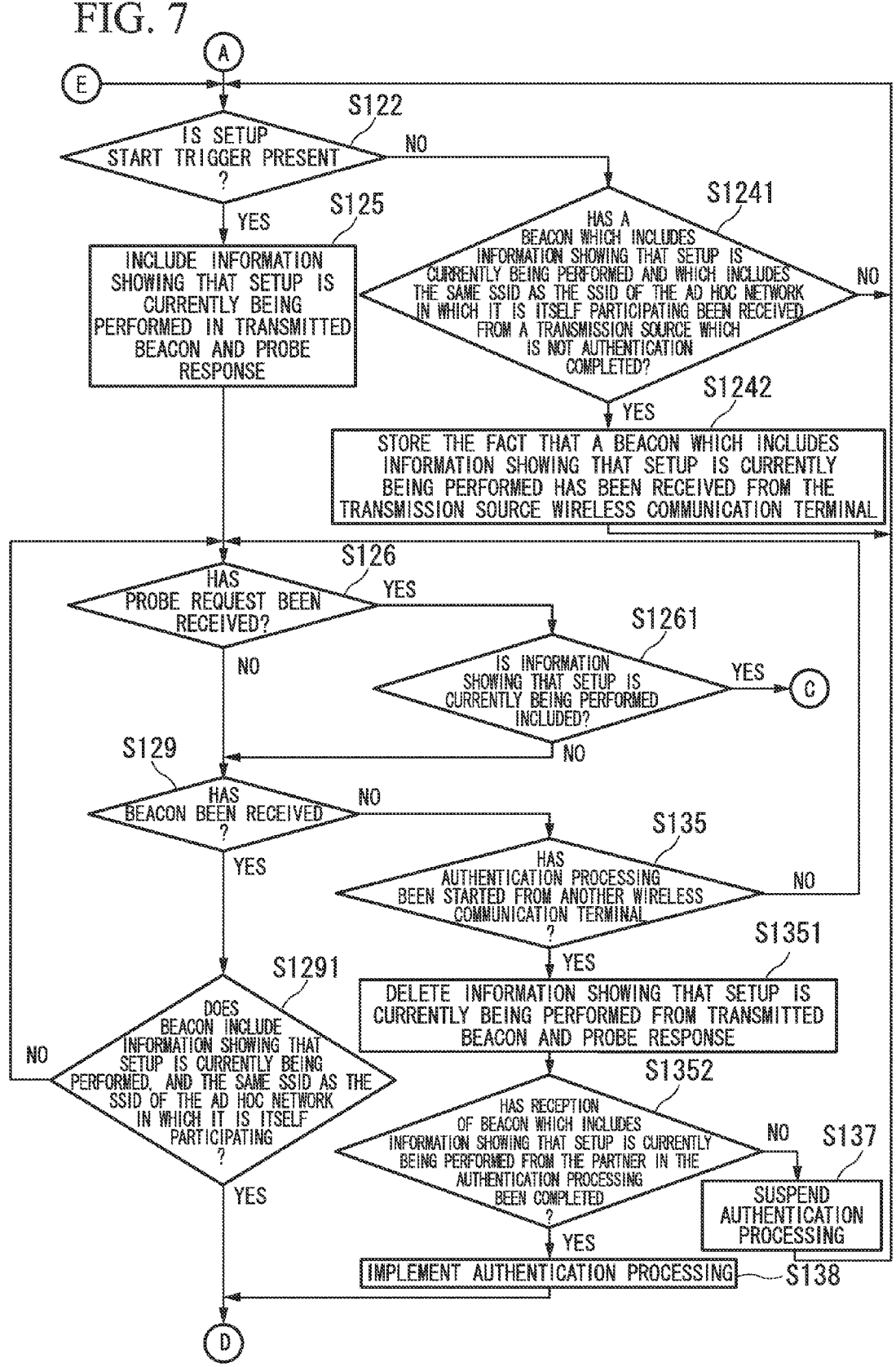
FIG. 7 is a flowchart showing a processing sequence of the wireless communication terminal according to the first preferred embodiment of the present invention.
Figure 8:
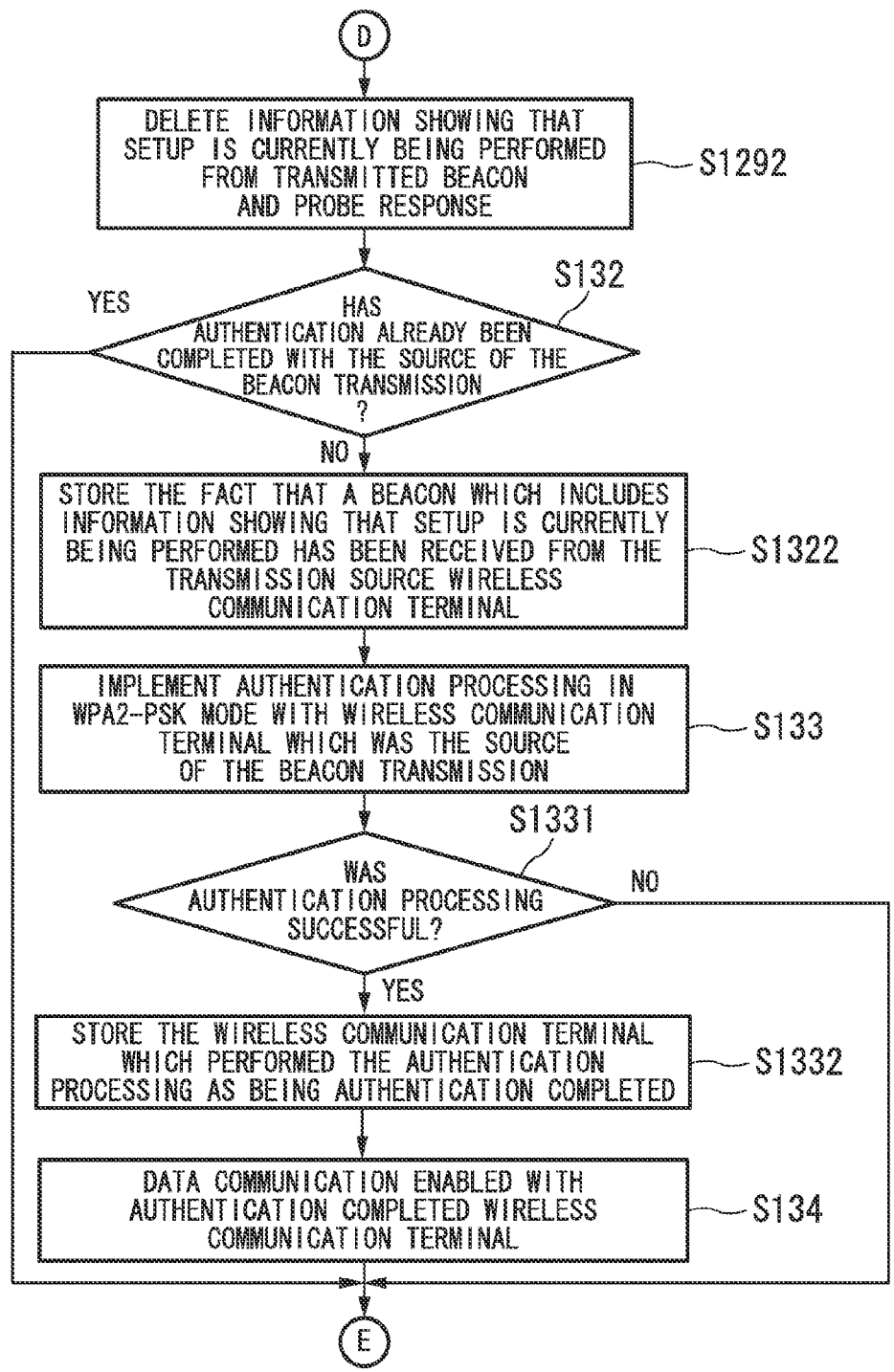
FIG. 8 is a flowchart showing a processing sequence of the wireless communication terminal according to the first preferred embodiment of the present invention.

FIG. 7 and FIG. 8 show operations of wireless communication terminals (i.e., the wireless communication terminal 1 and the wireless communication terminal 2 shown in FIG. 3, and the wireless communication terminals 1 through 3 shown in FIG. 4) that have completed participation mainly in an ad hoc network. The authentication control unit 10*d* determines whether or not a setup start trigger has been generated (step S122). If a setup start trigger has not been generated, the authentication control unit 10*d* determines whether or not a Beacon which includes information showing that setup is currently being performed and which also includes the same SSID as the SSID of the ad hoc network in which its own wireless communication terminal is participating has been received from a wireless communication terminal in an unauthenticated state (step S1241).

If a Beacon which includes information showing that setup is currently being performed has not been received, or if a Beacon which includes the same SSID as the SSID of the ad hoc network in which its own wireless communication terminal is participating has not been received, or if the wireless communication terminal which is the transmission source of the received Beacon has completed authentication, the routine moves to step S122. Moreover, if a Beacon which includes information showing that setup is currently being performed and which also includes the same SSID as the SSID of the ad hoc network in which its own wireless communication terminal is participating has been received from a wireless communication terminal in an unauthenticated state, the recognition unit 10*a* stores the MAC address of the wireless communication terminal which is the source of the Beacon transmission in the storage unit 14 together with a flag that shows that a Beacon which includes information showing that setup is currently being performed has been received (step S1242). The routine then moves to step S122.

If, however, a setup start trigger is generated in step S122, the authentication control unit 10*d* modifies the setting of the wireless communication terminal such that information showing that setup is currently being performed is included in subsequently transmitted Probe Requests and Probe Responses (step S125). Next, the authentication control unit 10*d* determines whether or not a Probe Request has been received from another wireless communication terminal (step S126). If a Probe Request has not been received, the routine moves to step S129.

If, however, a Probe Request has been received, the authentication control unit 10*d* determines whether or not information showing that setup is currently being performed is included in the received Probe Request (step S1261). If information showing that setup is currently being performed is included in the received Probe Request, the routine moves to step S116. If, however, information showing that setup is currently being performed is not included in the received Probe Request, the authentication control unit 10*d* determines whether or not a Beacon has been received from another wireless communication terminal (step S129).

If a Beacon has been received, the authentication control unit 10*d* determines whether or not information showing that setup is currently being performed is included in the received Beacon, and whether or not the same SSID as the SSID of the ad hoc network in which its own wireless communication terminal is participating is included in the received Beacon (step S1291). If information showing that setup is currently being performed is not included in the received Beacon, or if the same SSID as the SSID of the ad hoc network in which its own wireless communication terminal is participating is not included in the received Beacon, the routine moves to step S126. If, however, information showing that setup is currently being performed is included in the received Beacon, and if the same SSID as the SSID of the ad hoc network in which its own wireless communication terminal is participating is included in the received Beacon, the authentication control unit 10d alters the setting of the wireless communication terminal such that the information showing that setup is currently being performed is deleted from (i.e., such that the information showing that setup is currently being performed is no longer included in) any Beacon and Probe Response that are subsequently transmitted (step S1292).

Next, the authentication control unit 10d determines whether or not authentication has already been completed with the wireless communication terminal which is the source of the Beacon transmission based on the MAC addresses stored in the storage unit 14, and on whether or not the flag allocated to the MAC address of the wireless communication terminal that is the source of the Beacon transmission has already completed authentication (step S132). If authentication has already been completed with the wireless communication terminal which is the source of the Beacon transmission, the routine moves to step S122. If, on the other hand, authentication has not yet been completed with the wireless communication terminal which is the source of the Beacon transmission, the recognition unit 10a stores the MAC address of the wireless communication terminal which is the source of the Beacon transmission in the storage unit 14 together with a flag that shows that a Beacon which includes information showing that setup is currently being performed has been received (step S1322).

Next, the authentication control unit 10d controls the authentication unit 10b such that it performs authentication processing in WPA2-PSK between itself and the wireless communication terminal which is the source of the Beacon transmission (step S133). As a result, the authentication unit 10b performs authentication processing via the communication unit 11 between itself and the other wireless communication terminal. At this time, the selection unit 10c reads from the storage unit 14 the MAC address of the wireless communication terminal which is the source of the Beacon transmission, and the authentication control unit 10d controls the authentication unit 10b such that it performs authentication processing exclusively with the wireless communication terminal having this read MAC address, and prohibits authentication processing with other wireless communication terminals.

Next, the authentication control unit 10d determines whether or not the authentication processing was successful (step S1331). If the authentication processing failed, the routine moves to step S122. If, however, the authentication processing was successful, the authentication control unit 10d stores the MAC address of the wireless communication terminal which underwent the authentication processing in the storage unit 14 together with a flag showing that authentication has been completed (step S1332). Next, the authentication control unit 10d causes the communication unit 11 to wait on standby in order for data communication to be performed (step S120). Subsequently, the communication unit 11 performs data communication as this becomes necessary. The routine then moves to step S122.

If, however, a Beacon has not been received in step S129, the authentication control unit 10d determines whether or not authentication processing from another wireless communication terminal has begun (step S135). If authentication processing from another wireless communication terminal has not begun, the routine moves to step S126. If, however, authentication processing has begun, the authentication control unit 10d modifies the settings of the wireless communication terminal such that information showing that setup is currently being performed is deleted from (i.e., such that information showing that setup is currently being performed is not included in) any Beacon and Probe Response subsequently transmitted (step S1351).

Next, the authentication control unit 10d determines whether or not the receiving of a Beacon which includes information showing that setup is currently being performed from the wireless communication terminal which is the partner in the authentication processing has already been completed based on the MAC address of the wireless communication terminal which is the partner in the authentication processing, and on the MAC addresses of wireless communication terminals that have been stored in the storage unit 14 together with flags showing that a Beacon has been received (step S1352).

If a flag showing that a Beacon has been received is attached to the same MAC address as the MAC address of the wireless communication terminal which is the authentication processing partner, then it is determined that the receiving of a Beacon which includes information showing that setup is currently being performed from the wireless communication terminal which is the partner in the authentication processing has already been completed. If, however, a flag showing that a Beacon has been received is not attached to the same MAC address as the MAC address of the wireless communication terminal which is the authentication processing partner, or if the same MAC address as the MAC address of the wireless communication terminal which is the authentication processing partner is not stored in the storage unit 14, then it is determined that the receiving of a Beacon which includes information showing that setup is currently being performed from the wireless communication terminal which is the partner in the authentication processing has not yet been completed.

If the receiving of a Beacon which includes information showing that setup is currently being performed from the wireless communication terminal which is the partner in the authentication processing has already been completed, the authentication control unit 10d controls the authentication unit 10b such that it performs authentication processing in WPA2-PSK between itself and the wireless communication terminal which is the source of the Beacon transmission (step S138). As a result, the authentication unit 10b performs authentication processing via the communication unit 11 between itself and the other wireless communication terminal. At this time, the selection unit 10c reads from the storage unit 14 the MAC address of the wireless communication terminal which is the source of the Beacon transmission, and the authentication control unit 10d controls the authentication unit 10b such that it performs authentication processing exclusively with the wireless communication terminal having this read MAC address, and prohibits authentication processing with other wireless communication terminals. The routine then moves to step S1292.

If, however, the receiving of a Beacon which includes information showing that setup is currently being performed from the wireless communication terminal which is the partner in the authentication processing has not yet been completed, the authentication control unit 10d suspends the authentication processing (step S137). The routine then moves to step S122.

Note that the processings of steps S101 through S116 shown in FIG. 5 and FIG. 6, and steps S122, S125, S126, and S1261 shown in FIG. 7 and FIG. 8 correspond to an existing WPS protocol.

FIG. 9 shows an example of operations performed in accordance with the routines of FIG. 5 through FIG. 8 which correspond to FIG. 2. None of the wireless communication terminals shown in FIG. 9 is participating in an ad hoc network (corresponding to step S101). When a setup start trigger is generated as a result of a user pressing a button of the operating unit 12 (corresponding to step S102), the wireless communication terminal 1 begins the transmission of a Probe Request which contains information showing that setup is currently being performed (corresponding to steps S1022 and S1023). Note that although the destination of the Probe Request transmission is a broadcast, provided that a Beacon which includes the information showing that setup is currently being performed is received in advance, then it is also possible for the transmission source of that Beacon to be set as the transmission destination of the Probe Request.

The wireless communication terminal 2 receives the Probe Request from the wireless communication terminal 1, however, because the button of the operating unit 12 has not yet been pressed (corresponding to step S102), information showing that setup is currently being performed is not included in the Probe Response transmitted to the wireless communication terminal 1 (correspondence ends at step S1001).

The wireless communication terminal 1 receives the Probe Response from the wireless communication terminal 2 (corresponding to step S1024), however, because no information showing that setup is currently being performed is included therein (corresponding to step S1025), the wireless communication terminal 1 waits to receive the Probe Request while repeatedly transmitting the Probe Request at predetermined timings (correspondence ends at step S1023).

When a button of the operating unit 12 has been pressed so as to generate a setup start trigger (corresponding to step S102), the wireless communication terminal 2 transmits a Probe Request which includes information showing that setup is currently being performed (corresponding to steps S1022 and S1023).

When the Probe Request from the wireless communication terminal 2 is received by the wireless communication terminal 1 (corresponding to step S1024), it transmits to the wireless communication terminal 2 a Probe Response which includes information showing that setup is currently being performed (correspondence ends at steps S1001 and S1022). Because the Probe Request included information showing that setup is currently being performed (corresponding to step S1025), the wireless communication terminal 1 stops the transmission of the Probe Request (corresponding to step S1026).

Because the wireless communication terminal 2 has received a Probe Response which includes the information showing that setup is currently being performed from the wireless communication terminal 1 (corresponding to steps S1024 and S1025), it stops the transmission of the Probe Request (corresponding to step S1026), and implements connection setting by means of exchanging EAP messages with the wireless communication terminal 1 (corresponding to step S116).

The wireless communication terminal 1 implements connection setting between itself and the wireless communication terminal 2 (step S116).

The wireless communication terminal 1 and wireless communication terminal 2 which have implemented connection setting delete information showing that setup is currently being performed from the Beacon and Probe Response being transmitted (corresponding to step S1161). Because none of the wireless communication terminals is participating in an ad hoc network (corresponding to step S1162), one of the wireless communication terminals generates an ad hoc network based on the setting information for already created networks which was exchanged at the time of the connection setting (correspondence ends at step S1021), and then participates in this ad hoc network, while the other wireless communication terminal participates in this same ad hoc network (corresponding to step S1163). The wireless communication terminal 1 and the wireless communication terminal 2 start repeatedly transmitting a Beacon which includes the SSID of the ad hoc network in which they are participating (corresponding to step S1164). Note that in the connection setting, the connection setting is completed in a normal manner by one of the wireless communication terminals which possesses network setting information transmitting its own network setting information to the other wireless communication terminal.

Next, the wireless communication terminal 1 and the wireless communication terminal 2 implement authentication processing in WPA2-PSK (corresponding to step S119), and store the fact that each one of them has been mutually authenticated (corresponding to step S1191), and when authentication is completed data communication between the two is enabled (corresponding to step S120).

Note that in the WPA2-PSK or WPA-PSK used in the authentication processing, an encryption key is delivered by means of the exchange of four messages which is known as a 4-Way Handshake, however, in the case of an ad hoc network, this 4-Way Handshake is started once from each one of the wireless communication terminals, so as to be implemented a total of two times. In the drawings, it is shown as being started first from the wireless communication terminal 1 and then started next from the wireless communication terminal 2, however, it is also possible for this sequence to be reversed.

FIG. 10 shows an example of operations performed in accordance with the routines of FIG. 5 through FIG. 8 which correspond to FIG. 3. The wireless communication terminal 1 and the wireless communication terminal 2 start repeatedly transmitting a Beacon which includes the SSID ("AAA") of the ad hoc network (correspondence ends at step S1164).

When a button of the operating unit 12 has been pressed so as to generate a setup start trigger (corresponding to step S122), the wireless communication terminal 1 includes information showing that setup is currently being performed in the Beacon which it is repeatedly transmitting and in the Probe Response which it is going to transmit (corresponding to step S125).

When a button of the operating unit 12 has been pressed so that a setup start trigger is generated (corresponding to step S102), the wireless communication terminal 3 starts to transmit a Probe Request which includes information showing that setup is currently being performed(corresponding to steps S1022 and S1023).

Because the wireless communication terminal 2 has not generated a setup start trigger (corresponding to step S122), although it does receive the Probe Request, it does not include the information showing that setup is currently being performed in the Probe Response that it transmits to the wireless communication terminal 3 (correspondence ends at step S1001). Moreover, because the wireless communication terminal 2 receives a Beacon which includes information showing that setup is currently being performed from the wireless communication terminal 1 which is participating in the same ad hoc network, and stores the fact that the wireless communication terminal 1 has completed authentication (corresponding to step S1241), it waits for a setup start trigger to be generated.

When the wireless communication terminal 1 receives the Probe Request (corresponding to step S126), it transmits a Probe Response which includes information showing that setup is currently being performed to the wireless communication terminal 3 (correspondence ends at step S125). Because the received Probe Response includes information showing that setup is currently being performed (corresponding to step S1261), the wireless communication terminal 1 performs the connection setting in the same way as the wireless communication terminal 1 in FIG. 9.

Because the wireless communication terminal 3 has received the Probe Response which includes information showing that setup is currently being performed from the wireless communication terminal 1 (corresponding to steps S1024 and S1025), thereafter, it performs the same operations as it performed with the wireless communication terminal 2 shown in FIG. 9 between itself and the wireless communication terminal 1, and participates in an ad hoc network by making a connection setting between itself and the wireless communication terminal 1, and it performs authentication processing, and stores the fact that the wireless communication terminal 1 has been authenticated, and consequently is able to perform data communication.

After the wireless communication terminal 1 has ended the connection setting with the wireless communication terminal 3 (corresponding to step S116), it deletes the information showing that setup is currently being performed from Beacons and Probe Responses to be transmitted (corresponding to step S1161). Because the wireless communication terminal is already participating in an ad hoc network (corresponding to step S1162), it implements authentication processing in WPA2-PSK between itself and the wireless communication terminal 3 (corresponding to step S119), and stores the fact that the wireless communication terminal 3 has been authenticated (corresponding to step S1191), and when this authentication has been completed, data communication between the wireless communication terminal 1 and the wireless communication terminal 3 is enabled (corresponding to step S120).

FIG. 11 shows an example of operations performed in accordance with the routines of FIG. 5 through FIG. 8 which correspond to FIG. 4. The wireless communication terminals 1 through 3 start repeatedly transmitting a Beacon which includes the SSID ("AAA") of the ad hoc network (correspondence ends at step S1164).

When a button of the operating unit 12 has been pressed so as to generate a setup start trigger (corresponding to step S122), the wireless communication terminal 2 includes information showing that setup is currently being performed in the Beacon and in the Probe Response which it is repeatedly transmitting (corresponding to step S125). The wireless communication terminal 2 is not receiving a Probe request (corresponding to step S126), but is receiving Beacons from the wireless communication terminal 1 and the wireless communication terminal 3 (corresponding to step S129), however, because neither Beacon includes information showing that setup is currently being performed (corresponding to step S1291), it once again waits to receive a Probe Request or Beacon.

Setup start triggers are not generated in the wireless communication terminal 1 and the wireless communication terminal 3 (corresponding to step S122). When the wireless communication terminal 1 receives a Beacon from the wireless communication terminal 2, that Beacon contains information showing that setup is currently being performed, and the SSID contained in that Beacon is the same "AAA" as the SSID of the ad hoc network in which it is itself participating, however, because the fact that the wireless communication terminal 2 has completed authentication has been stored (corresponding to step S1241), the wireless communication terminal I once again waits for a setup start trigger to be generated. In contrast, because the fact that the wireless communication terminal 2 has completed authentication is not stored in the wireless communication terminal 3 (corresponding to step S1241), the wireless communication terminal 3 stores the fact that it has received a Beacon containing information showing that setup is currently being performed from the wireless communication terminal 2 (corresponding to step S1242).

When a button of the operating unit 12 has been pressed so as to generate a setup start trigger (corresponding to step S122), the wireless communication terminal 3 includes information showing that setup is currently being performed in the Beacon and Probe Response which it is repeatedly transmitting (corresponding to step S125).

When the wireless communication terminal 2 receives a Beacon from the wireless communication terminal 3 (corresponding to step S129), that Beacon contains information showing that setup is currently being performed, and because the SSID contained in that Beacon is the same "AAA" as the SSID of the ad hoc network in which it is itself participating, information showing that setup is currently being performed is deleted from the Beacons and Probe Responses to be subsequently transmitted (corresponding to step S1292). Moreover, because neither one of the wireless communication terminal 2 and the wireless communication terminal 3 have stored the fact that the other one has completed authentication (corresponding to step S132), the wireless communication terminal 2 stores the fact that it has received a Beacon which includes information showing that setup is currently being performed from the wireless communication terminal 3 (corresponding to step S1322), and implements authentication processing in WPA2-PSK between itself and the wireless communication terminal 3 (corresponding to step S133).

When authentication processing is started from the wireless communication terminal 2 (corresponding to step S135), the wireless communication terminal 3 deletes information showing that setup is currently being performed from subsequently transmitted Beacons and Probe Responses (corresponding to step S1351). Because the wireless communication terminal 3 has stored the fact that it has received a Beacon which includes information showing that setup is currently being performed from the wireless communication terminal 2 (corresponding to step S1352), it implements, authentication processing between itself and the wireless communication terminal 2 (corresponding to step S138).

When the wireless communication terminal 2 and the wireless communication terminal 3 have completed authentication processing (corresponding to step S1331), they both store the fact that each of them have completed authentication (corresponding to step S1332), and data communication between the two of them is enabled (corresponding to step S134).

Note that in the examples shown in FIG. 7 FIG. 8, and FIG. 11, the storing of the fact that a Beacon which includes information showing that setup is currently being performed has been received, and the authentication processing with the transmission source of the Beacon are performed based on the fact that a Beacon has been received, however, instead of the receiving of a Beacon, it is also possible for a wireless communication terminal to itself transmit a Probe Request, and to use the Probe Response which is transmitted back as a reply in place of the Beacon.

As is described above, in the present preferred embodiment, when the selection unit 10c has received a Beacon, Probe Request, or a Probe Response (i.e., an authentication request) which contains information showing that setup is currently being performed from a wireless communication terminal that has not yet implemented authentication processing, it selects the wireless communication terminal which is the source of that transmission as a subject for authentication processing. The authentication control unit 10d then performs authentication for the wireless communication terminal selected by the selection unit 10c, and prohibits authentication for terminals other than the wireless communication terminals selected by the selection unit 10c. As a result of this, authentication processing is performed exclusively with the wireless communication terminal selected by the selection unit 10c. Consequently, a wireless communication terminal is able to perform data communication exclusively with the portion of the wireless communication terminals that it has itself selected. A user is also able to select a wireless communication terminal to be the subject of authentication processing by pressing a button on the operating unit 12.

Second Preferred Embodiment

Next, a second preferred embodiment of the present invention will be described. In the second preferred embodiment, authentication processing is conducted with the partner in the authentication processing being a wireless communication terminal selected by the user by means of a different method from that used in the first preferred embodiment. The structure of the wireless communication terminals in the present preferred embodiment is the same as in the first preferred embodiment.

FIGS. 12A through 12E show the schematic operation when the authentication of terminals selected by a user is performed. The schematic operation of a wireless communication terminal will now be described while referring to FIGS. 12A through 12E.

Figure 12A:
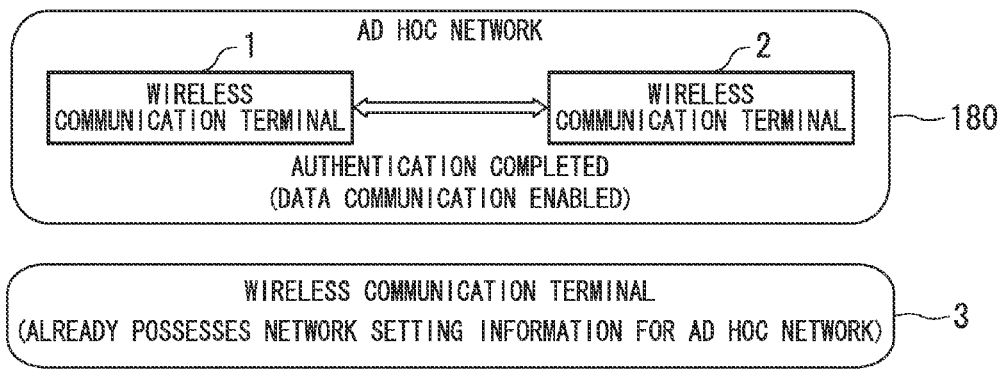
FIGS. 12A to 12E are views showing the schematic operation of the wireless communication terminal according to a second preferred embodiment of the present invention.

In FIG. 12A, from the state shown in FIG. 2E, a further wireless communication terminal 3 is willing to participate in the ad hoc network and to perform data communication. This wireless communication terminal 3 possesses network setting information. The network setting information can be obtained, for example, by means of the following six methods.

Figure 12B:
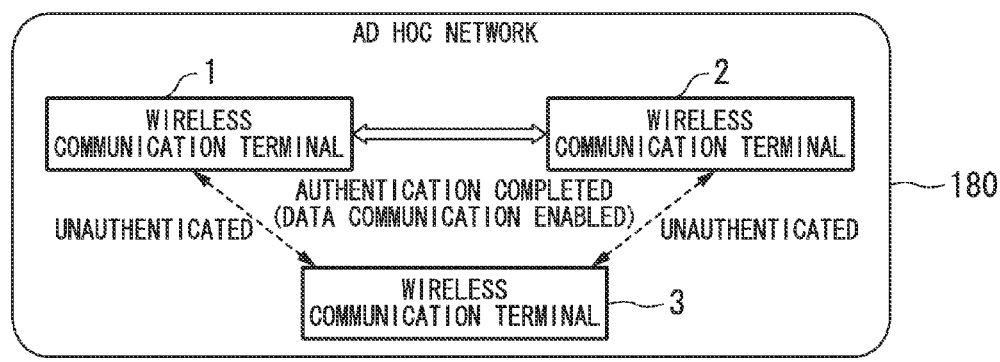

(1) The user inputs network setting information into the wireless communication terminal 3.
(2) The network setting information is acquired via another communication interface, (not shown) which is different from the communication unit 11.
(3) The network setting information is acquired via an external recording medium (not shown).
(4) The network setting information is extracted from image data acquired by means of an imaging unit (not shown).
(5) The network setting information is extracted from audio data input by means of an audio input unit (not shown).
(6) The network setting information is acquired by means of connection setting using WPS, or by other connection setting methods specific to various other companies:

In FIG. 12B, the wireless communication terminal 3 participates in the ad hoc network in accordance with the network connection information it possesses. At this point, the wireless communication terminal 3 has not yet implemented authentication processing to perform data communication with all of the wireless communication terminals within the ad hoc network, so that it is not yet able to perform data communication.

Figure 12C:
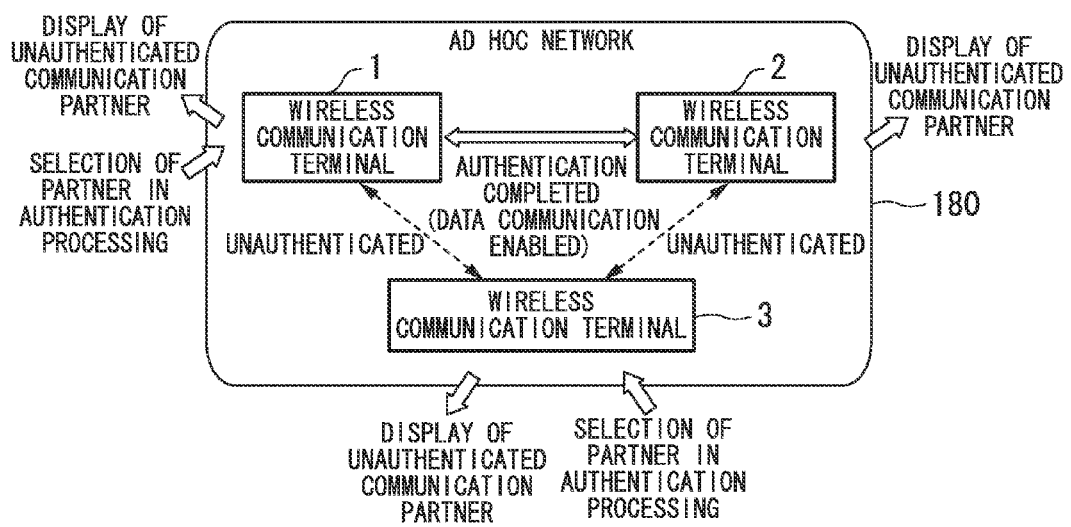

In FIG. 12C, each of the wireless communication terminals within the ad hoc network displays wireless communication terminals that are in an unauthenticated state within the ad hoc network, and waits for the user to make a selection. Thereafter, the wireless communication terminal 3 is selected by the user using the wireless communication terminal 1 as the partner in the data communication, and the wireless communication terminal 1 is selected as the data communication partner by the wireless communication terminal 3.

Figure 12D:
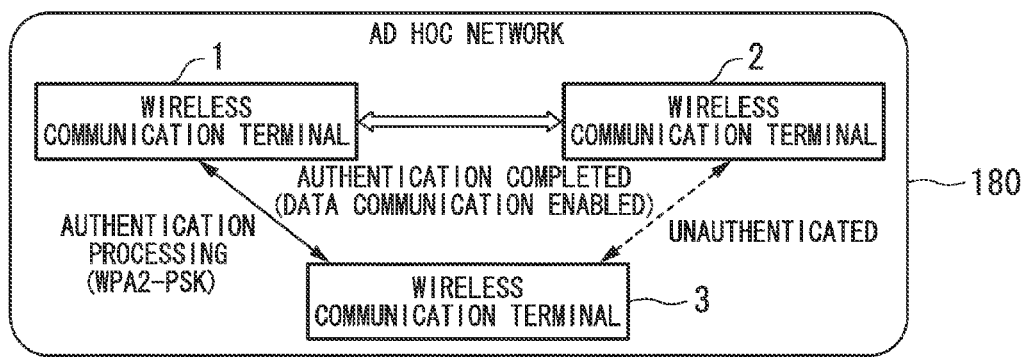

In FIG. 12D, when the wireless communication terminal 1 and the wireless communication terminal 3 are selected by the user, the wireless communication terminal 1 and the wireless communication terminal 3 perform mutual authentication processing for each other.

Figure 12E:
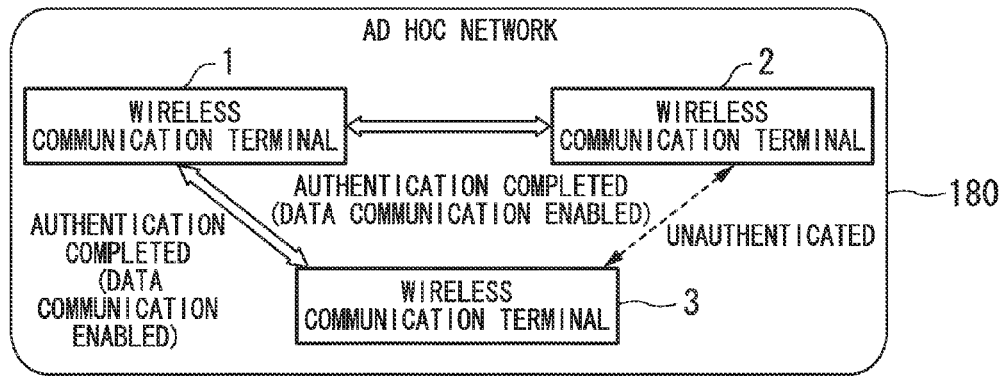

In FIG. 12E, when authentication processing is completed between the wireless communication terminal 1 and the wireless communication terminal 3, authentication has finished between the two wireless communication terminals and data communication between these two is enabled. In contrast, because authentication processing has not yet been implemented between the wireless communication terminal 2 and the wireless communication terminal 3, as before, data communication remains unable to be performed between these two.

Figure 13:
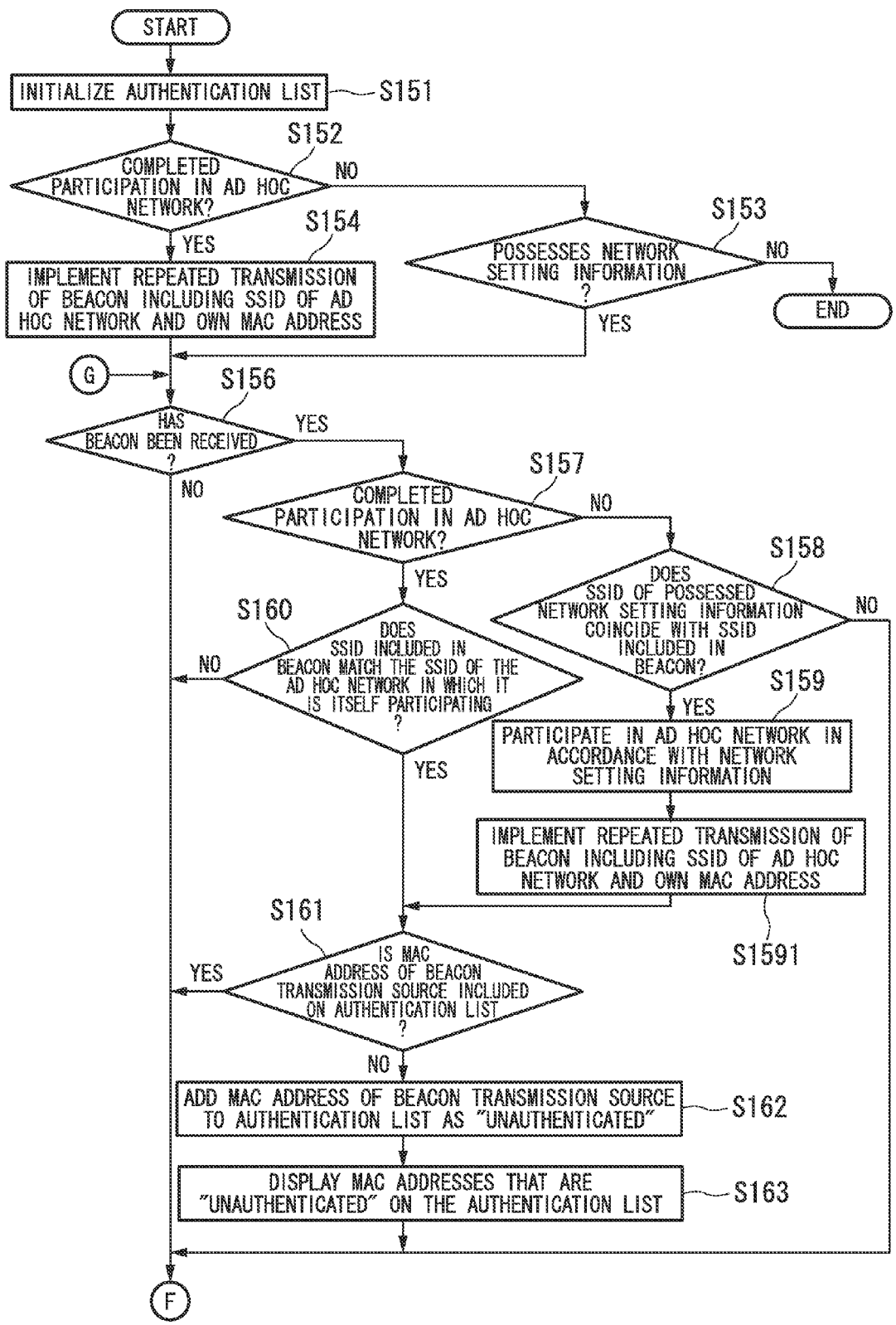
FIG. 13 is a flowchart showing a processing sequence of the wireless communication terminal according to the second preferred embodiment of the present invention.
Figure 14:
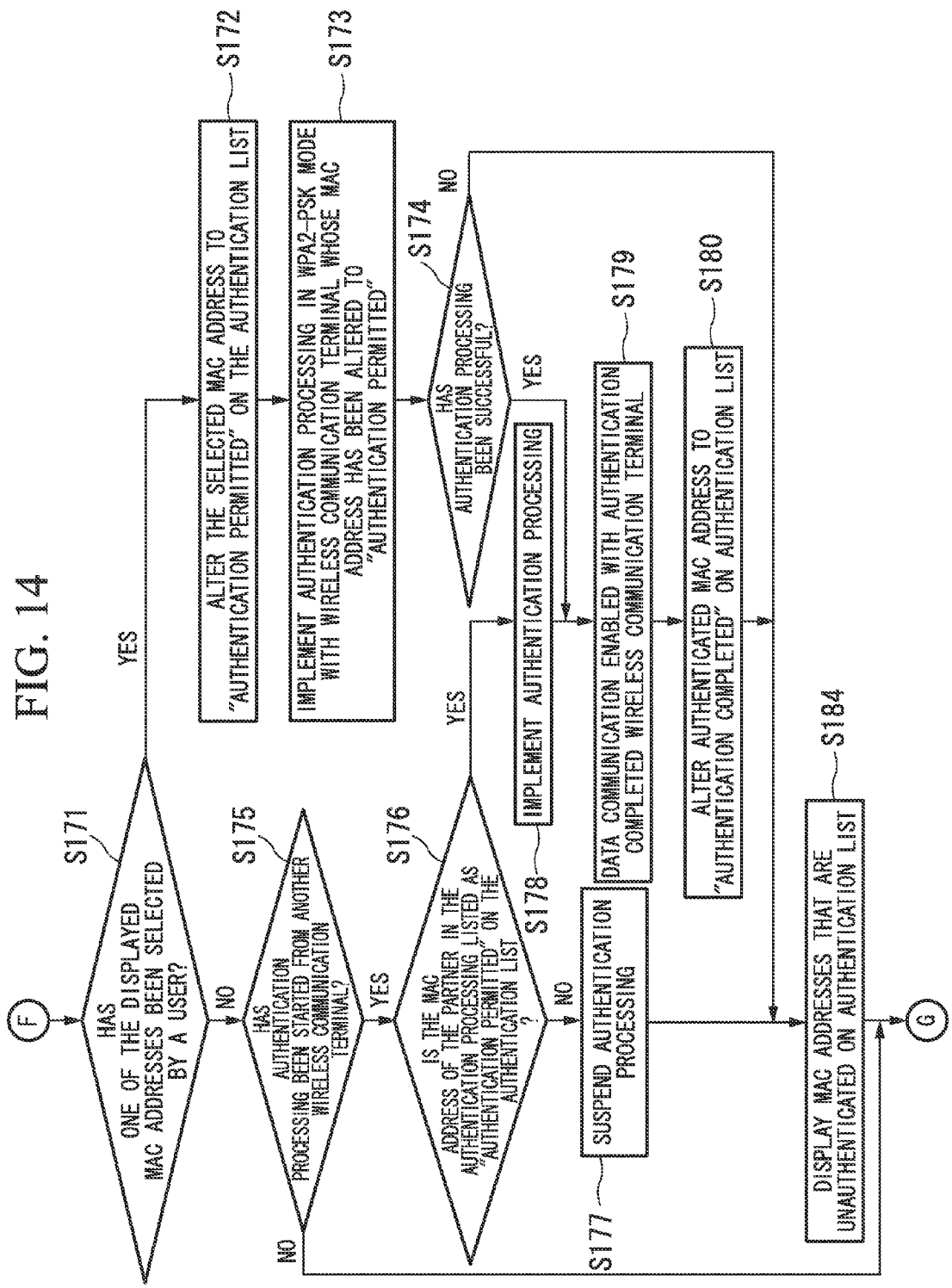
FIG. 14 is a flowchart showing a processing sequence of the wireless communication terminal according to the second preferred embodiment of the present invention.
Figure 15:
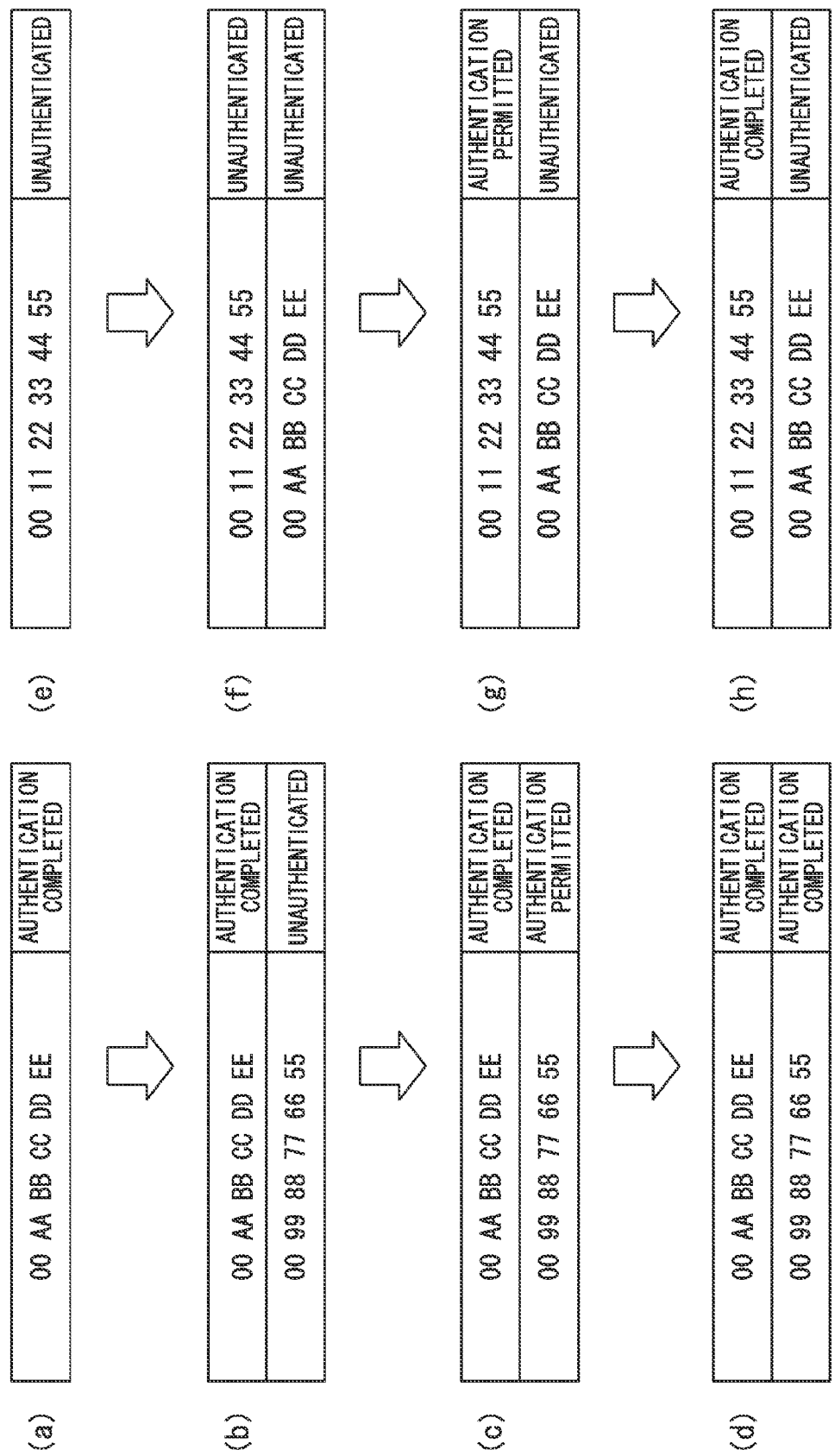
FIG. 15 is a reference diagram showing the contents of an authentication list according to the second preferred embodiment of the present invention.
Figure 16:
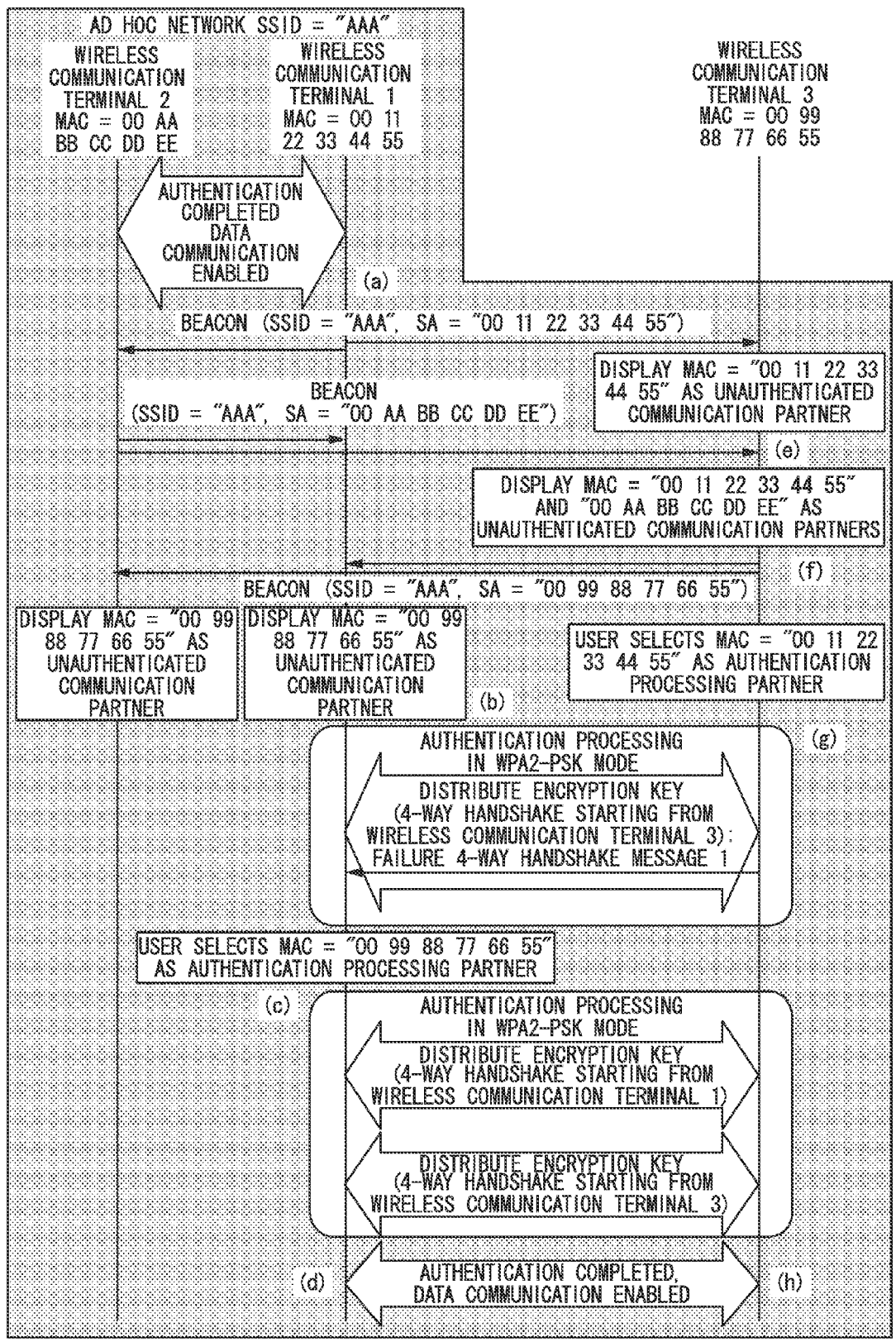
FIG. 16 is a sequence showing a communication procedure between wireless communication terminals according to the second preferred embodiment of the present invention.

Next, detailed operations of the wireless communication terminal will be described with reference made to FIG. 13 through FIG. 16. FIG. 13 and FIG. 14 show in detail the processing sequence of a wireless communication terminal. FIG. 15 shows an example of the contents of an authentication list which is stored in a wireless communication terminal. FIG. 16 shows specific examples of operations in accordance with FIG. 13 and FIG. 14. By referring to FIG. 13 and FIG. 14 after referring to FIG. 16, a more complete understanding of the operations of FIG. 13 and FIG. 14 may be obtained.

FIG. 13 and FIG. 14 show operations of wireless communication terminals (i.e., the wireless communication terminals 1 through 3 shown in FIG. 10). The authentication control unit 10d initializes an authentication list stored in the storage unit 14 (step S151). As is shown in FIG. 15, this authentication list associates the MAC addresses of other wireless communication terminals that could be recognized by Beacons transmitted from the other wireless communication terminals that are present within an ad hoc network in which its own wireless communication terminal is participating, with state information which shows the authentication state that corresponds to the MAC addresses.

"Authentication complete" shows a state in which authentication between its own wireless communication terminal and that particular wireless communication terminal has been completed. "Authentication permitted" shows a state in which authentication between its own wireless communication terminal and that particular wireless communication terminal has not yet been completed, however, it is permissible for authentication processing to be performed. "Unauthenticated" shows a state in which authentication between its own wireless communication terminal and that particular wireless communication terminal has not yet been completed, and it is not permissible for authentication processing to be performed. The individual contents in the authentication list shown in FIG. 15 will be described when FIG. 16 is described.

Continuing on from step S151, the authentication control unit 10*d* determines whether or not its own wireless communication terminal has completed participation in an ad hoc network (step S152). The method used for the determination of step S152 is the same as the method used for the determination of step S101 shown in FIG. 5.

If its own wireless communication terminal has not completed participation in the ad hoc network, the authentication control unit 10*d* determines whether or not network setting information is stored in the storage unit 14 (step S153). If network setting information is not stored in the storage unit 14, the routine is ended. If network setting information is stored in the storage unit 14, the routine moves to step S156.

If, on the other hand, the authentication control unit 10*d* determines in step S152 that its own wireless communication terminal has completed participation in the ad hoc network, the authentication control unit 10*d* reads from the storage unit 14 the SSID of that ad hoc network and the MAC address of its own wireless communication terminal, and then controls the communication unit 11 such that it repeatedly transmits a Beacon which includes that SSID and MAC address (step S154).

Next, the authentication control unit 10*d* determines whether or not a Beacon has been received from another wireless communication terminal (step S156). If a Beacon has not been received from another wireless communication terminal, the routine moves to step S171. If, however, a Beacon has been received from another wireless communication terminal, the recognition unit 10*a* identifies from the received Beacon the MAC address of the wireless communication terminal which is the source of the transmission. Furthermore, the authentication control unit 10*d* determines whether or not its own wireless communication terminal has completed participation in the ad hoc network (step S157). The method used for the determination in step S157 is the same as the method used for the determination in step S101 shown in FIG. 5.

If its own wireless communication terminal has not completed participation in the ad hoc network, the authentication control unit 10*d* reads the SSID which is a portion of the network setting information stored in the storage unit 14, and determines whether or not it matches the SSID contained in the Beacon (step S158). If the two SSID do not match, the routine moves to step S171. If the two SSID do match, the authentication control unit 10*d* participates in the ad hoc network based on the network setting information (step S159). Next, the authentication control unit 10*d* reads from the storage unit 14 the SSID of the ad hoc network in which it has completed participation and reads the MAC address of its own wireless communication terminal, and controls the communication unit 11 such that it repeatedly transmits a Beacon which includes that SSID and MAC address (step S1591). Next, the routine moves to step S161.

If, however, the authentication control unit 10*d* determines in step S157 that its own wireless communication terminal has completed participation in the ad hoc network, the authentication control unit 10*d* determines whether or not the SSID contained in the Beacon is the same as the SSID of the ad hoc network in which its own wireless communication terminal is participating (step S160). If the two SSID are not the same, the routine moves to step S171. If the two SSID are the same, the authentication control unit 10*d* determines whether or not the MAC address of the wireless communication terminal which is the source of the Beacon transmission is included in an authentication list stored in the storage unit 14 (step S161).

If the MAC address of the wireless communication terminal which is the source of the Beacon transmission is included in the authentication list, the routine moves to step S171. If, however, the MAC address of the wireless communication terminal which is the source of the Beacon transmission is not included in the authentication list, the authentication control unit 10*d* adds the MAC address of the wireless communication terminal which is the source of the Beacon transmission to the authentication list, and sets the state information within the authentication list which corresponds to that MAC address as being unauthenticated (step S162). Next, the selection unit 10*c* reads the authentication list from the storage unit 14, and selects MAC addresses whose state information is set as unauthenticated, and displays those MAC addresses on the display unit 13 (step S163). As a result of this, a user is able to hasten the selection of an unauthenticated wireless communication terminal.

Next, based on information from the operating unit 12, the authentication control unit 10*d* determines if any of the MAC addresses displayed on the display unit 13 has been selected as a result of the user operating the operating unit 12 (step S171). If any of the MAC addresses displayed on the display unit 13 has been selected, the authentication control unit 10*d* modifies the state information which corresponds to the same MAC address as the selected MAC address within the authentication list stored in the storage unit 14 so that this information is now listed as "authentication permitted" (step S172).

Next, the authentication control unit 10*d* controls the authentication unit 10*b* such that authentication processing is performed in WPA2-PSK between its own terminal and the wireless communication terminal which possesses the MAC address whose state information was altered in step S172 to "authentication permitted" (step S173). As a result of this, the authentication unit 10*b* performs authentication processing via the communication unit 11 between its own terminal and the other wireless communication terminal. At this time, the selection unit 10*c* reads from the authentication list the MAC address whose state information was altered in step S172 to "authentication permitted", and the authentication control unit 10*d* controls the authentication unit 10*b* such that it performs authentication processing exclusively with the wireless communication terminal having this read MAC address, and prohibits authentication processing with other wireless communication terminals.

Next, the authentication control unit 10*d* determines whether or not the authentication processing was successful (step S174). If the authentication processing was successful, the routine moves to step S179. If, however, the authentication processing failed, the routine moves to step S184.

If, however, in step S171 none of the MAC addresses displayed on the display unit 13 are selected, the authentication control unit 10*d* determines whether or not authentication processing has been started from another wireless communication terminal (step S175). If authentication processing has not been started from another wireless communication terminal, the routine moves to step S156. If, however, authentication processing has been started from another wireless communication terminal, the authentication control unit 10*d* determines whether or not the state information which is associated with the same MAC address as the MAC address of the partnering wireless communication terminal about which notification is given when the authentication processing is started lists the MAC address as being "authentication permitted" in the authentication list stored in the storage unit 14 (step S176).

If the state information is not "authentication permitted", the authentication control unit 10d suspends the authentication processing (step S177). Next, the selection unit 10c reads the authentication list from the storage unit 14, and selects a MAC address whose state information lists it as being unauthenticated and displays that MAC address on the display unit 13 (step S184). As a result of this, a user is able to hasten the selection of an unauthenticated wireless communication terminal. Next, the routine moves to step S156.

If, on the other hand, it is determined in step S176 that the state information does not list the MAC address as being "authentication permitted", the authentication control unit 10d controls the authentication unit 10b such that authentication processing is performed in WPA2-PSK between its own terminal and the wireless communication terminal which started the authentication processing (step S178). As a result of this, the authentication unit 10b performs authentication processing via the communication unit 11 between its own terminal and the other wireless communication terminal. At this time, the selection unit 10c controls the authentication unit 10b such that it performs authentication processing exclusively with the wireless communication terminal having the MAC address about which notification is given when the authentication processing is started, and prohibits authentication processing with other wireless communication terminals.

Next, the authentication control unit 10d causes the communication unit 11 to wait on standby in order for data communication to be performed (step S179). Subsequently, the communication unit 11 performs data communication as this becomes necessary. Next, the authentication control unit 10d modifies the state information which corresponds to the same MAC address as the selected MAC address of the partnering wireless communication terminal in the authentication processing within the authentication list stored in the storage unit 14 so that this information now reads as "authentication completed" (step S180). Next, the routine moves to step S184.

FIG. 16 shows an example of operations performed in accordance with the routines of FIG. 13 and FIG. 14 which correspond to FIG. 12. The wireless communication terminal 1 and the wireless communication terminal 2 are already operating in accordance with FIG. 13 and FIG. 14, and are repeatedly transmitting a Beacon which includes the SSID ("AAA") of the ad hoc network, and which also includes as an SA (i.e., source address) its own MAC addresses ("00 11 22 33 44 55" in the case of the wireless communication terminal 1, and "00 AA BB CC DD EE" in the case of the wireless communication terminal 2). Moreover, the wireless communication terminal 1 and the wireless communication terminal 2 are in a state in which they have both completed their mutual authentication of each other, and each other's MAC addresses on the authentication list stored in each one has been listed as being "authentication completed" (i.e., the state shown in FIG. 15 (a) in the wireless communication terminal 1), and they are assumed to be operating within a loop governed by the determinations in steps S156, S171, and S175 in FIG. 13 and FIG. 14.

As was described with reference made to FIG. 12A, it is assumed that the wireless communication terminal 3 has acquired in advance by some means network setting information for the ad hoc network whose SSID is "AAA". The wireless communication terminal 3 initializes the authentication list (corresponding to step S151). Although the wireless communication terminal 3 is not participating in the ad hoc network (corresponding to step S152), it does possess network setting information (corresponding to step S153).

The wireless communication terminal 2 receives a Beacon transmitted from the wireless communication terminal 1 (corresponding to step S156). The wireless communication terminal 2 itself has completed participation in the ad hoc network (corresponding to step S157), and the SSID contained within the Beacon and the SSID of the ad hoc network in which it is itself participating are the same "AAA" (corresponding to step S160). In addition, the MAC address "00 11 22 33 44 55" of the wireless communication terminal 1 is included on the authentication list of the wireless communication terminal 2 (corresponding to step S161).

When the wireless communication terminal 3 receives a Beacon transmitted from the wireless communication terminal 1 (corresponding to step S156), because it is not itself participating man ad hoc network (corresponding to step S157), and the SSID of the network setting information which it possesses itself and the SSID included in the Beacon are both the same, namely, "AAA" (corresponding to step S158), it participates in an ad hoc network in accordance with the network setting information (corresponding to step S159). In addition, the wireless communication terminal 3 repeatedly transmits a Beacon which includes the SSID ("AAA") of the ad hoc network, and which also includes as the SA (source address) its own MAC address "00 99 88 77 66 55" (corresponding to step S1591).

Because the MAC address "00 11 22 33 44 55" of the wireless communication terminal 1 which is the transmission source of the Beacon received by the wireless communication terminal 3 is not included on the authentication list of the wireless communication terminal 3 (corresponding to step S161) the wireless communication terminal 3 adds that MAC address "00 11 22 33 44 55" to the authentication list as an unauthenticated address (corresponding to step S162). The authentication list of the wireless communication terminal 3 at this time is in the state shown in FIG. 15 (e). At this point, because only the MAC address "00 11 22 33 44 55" is unauthenticated on the authentication list of the wireless communication terminal 3, the wireless communication terminal 3 displays this MAC address on the display unit 13 (corresponding to step S163).

The wireless communication terminal 1 receives the Beacon transmitted from the wireless communication terminal 2 (corresponding to step S156). The wireless communication terminal 1 has itself completed participation in the ad hoc network (corresponding to step S157), and the SSID of the Beacon and the SSID of the ad hoc network in which it is itself participating are both the same, namely, "AAA" (corresponding to step S160). In addition, the MAC address "00 AA BB CC DD EE" of the wireless communication terminal 2 is included on the authentication list of the wireless communication terminal 1 (corresponding to step S161).

When the wireless communication terminal 3 receives the Beacon transmitted from the wireless communication terminal 2 (corresponding to step S156), because it has itself completed participation in the ad hoc network (corresponding to step S157), and because the SSID of the Beacon and the SSID of the ad hoc network in which it is itself participating are both the same, namely, "AAA" (corresponding to step S160), and because the MAC address "00 AA BB CC DD EE" of the wireless communication terminal 2 which is the source of the Beacon transmission is not included on the authentication list (corresponding to step S161), the wireless communication terminal 3 adds that MAC address "00 AA BB CC DD EE" to the authentication list as an unauthenticated address (corresponding to step S162). The authentication list of the wireless communication terminal 3 at this time is in the state shown in FIG. 15 (*f*). At this point, because the MAC addresses "00 11 22 33 44 55" and "00 AA BB CC DD EE" are unauthenticated on the authentication list of the wireless communication terminal 3, the wireless communication terminal 3 displays these MAC addresses on the display unit 13 (corresponding to step S163).

When the wireless communication terminal 1 and the wireless communication terminal 2 receive a Beacon transmitted from the wireless communication terminal 3 (corresponding to step S156), because they have themselves completed participation in the ad hoc network (corresponding to step S157), and because the SSID of the Beacon and the SSID of the ad hoc network in which they are themselves participating are both the same, namely, "AAA" (corresponding to step S160), and because the MAC address "00 99 88 77 66 55" of the wireless communication terminal 3 is not included on the authentication list (corresponding to step S161), the MAC address "00 99 88 77 66 55" of the wireless communication terminal 3 which is the source of the Beacon transmission is added as an unauthenticated address to the authentication list (corresponding to step S162). The authentication list at this time is in the state shown in FIG. 15 (*b*) in the wireless communication terminal 1. At this point, because only the MAC address "00 99 88 77 66 55" is unauthenticated on the authentication lists of the wireless communication terminal 1 and the wireless communication terminal 2, the wireless communication terminal 1 and the wireless communication terminal 2 display this MAC address on the display unit 13 (corresponding to step S163).

Thereafter, when the user operates the operating unit 12 of the wireless communication terminal 3 and selects "00 11 22 33 44 55" from among the displayed MAC addresses (corresponding to step S171), the wireless communication terminal 3 modifies the MAC address "00 11 22 33 44 55" on the authentication list to "authentication permitted" (corresponding to step S172). The authentication list of the wireless communication terminal 3 at this time is in the state shown in FIG. 15 (*g*). The wireless communication terminal 3 then implements authentication processing in WPA2-PSK between itself and the wireless communication terminal 1 which has the MAC address "00 11 22 33 44 55".

The authentication processing in WPA2-PSK is started from the wireless communication terminal 3 (corresponding to step S175), however, the MAC address "00 99 88 77 66 55" of the wireless communication terminal 3 is unauthenticated in the authentication list of the wireless communication terminal 1 and is not listed as being "authentication permitted" (corresponding to step S176). Because of this, the wireless communication terminal 1 does not reply by means of a Message 2 to the Message 1 of the 4-Way Handshake in WPA2-PSK that was transmitted from the wireless communication terminal 3, and suspends the authentication processing (corresponding to step S177). Because only the wireless communication terminal 3 remains in an unauthenticated state on the authentication list, the wireless communication terminal 1 continues to display the MAC address "00 99 88 77 66 55" (corresponding to step S184).

In contrast, the wireless communication terminal 3 determines that the authentication processing was not successful (corresponding to step S174). The MAC address "00 11 22 33 44 55" of the wireless communication terminal 1 on the authentication list is altered to "authentication permitted", and because, at this time, only the MAC address "00 AA BB CC DD EE" is listed as being unauthenticated, the wireless communication terminal 3 only displays the MAC address "00 AA BB CC DD EE" on the display unit 13 (corresponding to step S184).

Thereafter, when the user operates the operating unit 12 of the wireless communication terminal 1 and selects the displayed MAC address "00 99 88 77 66 55" (corresponding to step S171), the wireless communication terminal 1 alters the MAC address "00 99 88 77 66 55" on the authentication list to "authentication permitted" (corresponding to step S172). The authentication list of the wireless communication terminal 1 at this time is in the state shown in FIG. 15 (*c*). The wireless communication terminal 1 then implements authentication processing in WPA2-PSK between itself and the wireless communication terminal 3 which has the MAC address "00 99 88 77 66 55".

The authentication processing in WPA2-PSK is started from the wireless communication terminal 1 (corresponding to step S175), and because the MAC address "00 11 22 33 44 55" of the wireless communication terminal 1 is listed as being "authentication permitted" on the authentication list of the wireless communication terminal 3 (corresponding to step S176), the wireless communication terminal 3 implements authentication processing in WPA2-PSK between itself and the wireless communication terminal 1 (corresponding to step S178).

The wireless communication terminal 1 then determines that the authentication processing between itself and the wireless communication terminal 3 has been successful (corresponding to step S174), and data communication between these two is enabled (corresponding to step S179). The wireless communication terminal 1 alters the MAC address "00 99 88 77 66 55" of the wireless communication terminal 3 whose authentication has been successful on the authentication list from "authentication permitted" to "authentication completed" (corresponding to step S180). The authentication list of the wireless communication terminal 1 at this time is in the state shown in FIG. 15 (*d*), and because no unauthenticated MAC address is listed thereon, the wireless communication terminal 1 does not display any MAC addresses (corresponding to step S184).

The wireless communication terminal 3 is now able to perform data communication between itself and the wireless communication terminal 1 (corresponding to step S179). The wifeless communication terminal 3 then alters the MAC address "00 11 22 33 44 55" of the wireless communication terminal 1 whose authentication has been successfull on the authentication list from "authentication permitted" to "authentication completed" (corresponding to step S180). The authentication list of the wireless communication terminal 3 at this time is in the state shown in FIG. 15 (*h*). The wireless communication terminal 3 only displays the unauthenticated MAC address "00 AA BB CC DD EE" on the display unit 13 (corresponding to step S184).

Note that in this example, only the MAC addresses are included in the Beacon as information pertaining to the wireless communication terminals, and are listed on the authentication list and displayed on the wireless communication terminals, however, it is also possible to use other information in addition to the MAC addresses. For example; it is also possible to include information about the wireless communication terminal (e.g., various types of information such as the owner and manufacturers' names and purpose of use such as "manufactured by XXX Co. and main DSC of YYY") within the Vendor specific information element within the frame body of the Beacon, and to associate the information with the MAC addresses on the authentication list and then store them, and to also display the information in association with the MAC addresses when they are displayed on the wireless communication terminal.

Note that in the examples shown in FIG. 13, FIG. 14, and FIG. 16, the addition of the unauthenticated MAC addresses to the authentication list is performed based on the fact that a Beacon has been received, however, instead of the receiving of a Beacon, it is also possible for a wireless communication terminal to itself transmit a Probe Request and to use the Probe Response which is transmitted back as a reply in place of the Beacon.

As is described above, in the present preferred embodiment, when the selection unit 10c has received a Beacon (i.e., an authentication request) from a wireless communication terminal that has not yet implemented authentication processing, and that wireless communication terminal has been selected by a user, it selects that wireless communication terminal which is a subject for authentication processing. The authentication control unit 10d then performs authentication for the wireless communication terminal selected by the selection unit 10c, and prohibits authentication for terminals other than the wireless communication terminals selected by the selection unit 10c. As a result of this, authentication processing is performed exclusively with the wireless communication terminal selected by the selection unit 10c. Consequently, a wireless communication terminal is able to perform data communication exclusively with a limited number of the wireless communication terminals that it has itself selected. A user is also able to select a wireless communication terminal to be the subject of authentication processing.

Third Preferred Embodiment

Next, a third preferred embodiment of the present invention will he described. The third preferred embodiment is a variant of the second preferred embodiment. The structure of the wireless communication terminals in the present preferred embodiment is the same as in the first preferred embodiment. In addition, the schematic operation when a terminal selected by a user is being authenticated is the same as that shown in FIG. 12.

Figure 17:
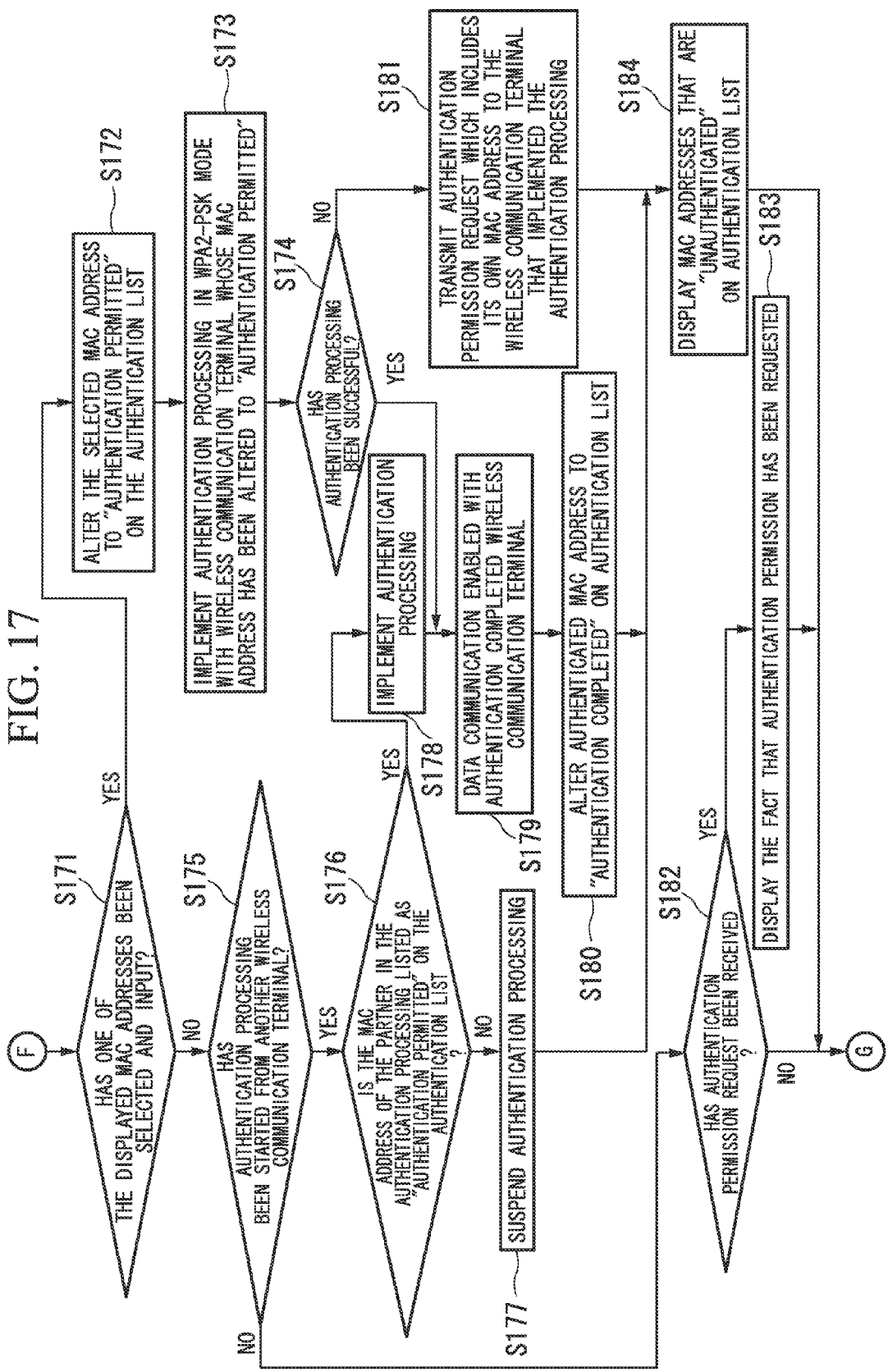
FIG. 17 is a flowchart showing a processing sequence of the wireless communication terminal according to a third preferred embodiment of the present invention.

FIG. 17 shows an operation of a wireless communication terminal, and is a variant of FIG. 14. The processing shown in FIG. 13 is also applied in the same way to the present preferred embodiment. The processing shown in FIG. 17 will now be described. In FIG. 17, the same symbols are used for steps that-are the same as those shown in FIG. 14 and any description of these steps is omitted.

If the authentication processing in step S174 has not been successful, the authentication control unit 10d transmits via the communication unit 11 an authentication permission request (i.e., an authentication request) which includes the MAC address of its own wireless communication terminal to another wireless communication terminal which implemented authentication processing in step S173 (step S181).

If authentication processing was not started from another wireless communication terminal in step S175, the authentication control unit 10d determines whether or not an authentication permission request has been received from another wireless communication terminal (step S182). If an authentication permission request has not been received, the routine moves to step S156. If, however, an authentication permission request has been received, the authentication control unit 10d displays on the display unit 13 the fact that a request to permit authentication has been made (step S183). At this time, among the unauthenticated MAC addresses being displayed, it is also possible for the display color of the portion of the display which corresponds to the MAC address of the source of the authentication permission request to be changed, or for the display of this portion to be highlighted, or else a message requesting authentication permission may be additionally displayed, or a message may be displayed separately from the unauthenticated MAC address which is being displayed. The routine then moves to step S156.

In the processing shown in FIG. 17, if the authentication processing has failed, then the state information pertaining to the MAC address of its own wireless communication terminal is not listed on the authentication list of the communication partner wireless communication terminal as being "authentication permitted". In order to have this state information altered to "authentication permitted", an authentication permission request is transmitted to the communication partner wireless communication terminal which has attempted to perform authentication processing, and the contents of this authentication permission request are displayed on the communication partner wireless communication terminal. Thereafter, when the wireless communication terminal which is the transmission source of the authentication permission request is selected on the communication partner wireless communication terminal, and the state information pertaining to the MAC address thereof is altered to "authentication permitted", the authentication processing is implemented once again.

Figure 18:
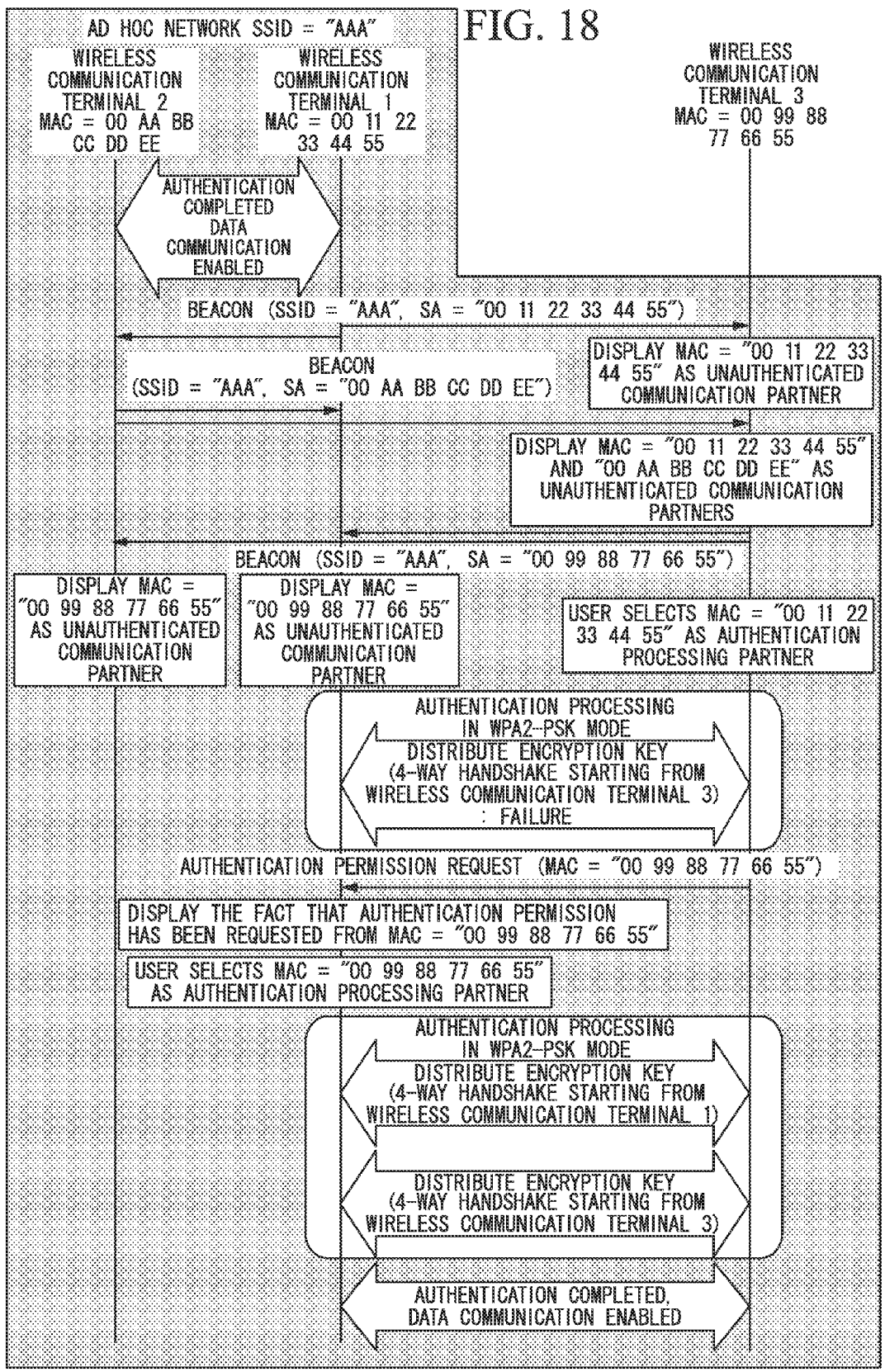
FIG. 18 is a sequence showing a communication procedure between wireless communication terminals according to the third preferred embodiment of the present invention.

FIG. 18 shows an example of operations performed in accordance with the routine of FIG. 17 which corresponds to FIG. 12. Because a large number of portions are similar to FIG. 16, the following description will center on points of variance with FIG. 16. The wireless communication terminal 3 implements authentication processing in WPA2-PSK between itself and the wireless communication terminal 1 which has the MAC address "00 11 22 33 44 55" (corresponding to step S173). Because the authentication processing has not been successful (corresponding to step S174), the wireless communication terminal 3 transmits an authentication permission request which includes its own MAC address to the wireless communication terminal 1 which implemented the authentication processing (corresponding to step S181).

When the wireless communication terminal 1 receives the authentication permission request (corresponding to step S182), it displays on the display unit 13 the fact that a request to permit authentication has been made (corresponding to step S183). Thereafter, when a user operates the operating unit 12 of the wireless communication terminal 1 so as to select the displayed MAC address "00 99 88 77 66 55", authentication processing in WPA2-PSK between the wireless commute occasion terminal 1 and the wireless communication terminal 3 is implemented.

As has been described above, according to the present preferred embodiment, it is possible for a wireless communication terminal to perform data communication exclusively with a limited number of wireless communication terminals which it has itself selected, and a user is able to select a wireless communication terminal to be the subject of authentication processing. In addition, if the authentication of its own wireless communication terminal has not been permitted in the communication partner wireless communication terminal which is implementing the authentication processing, by transmitting an authentication permission request (i.e., an authentication request) to that wireless communication terminal, and encouraging that wireless communication terminal to permit authentication, the authentication processing can be implemented more reliably.

Fourth Preferred Embodiment

Next, a fourth preferred embodiment of the present invention will be described. The fourth preferred embodiment is a variant of the second preferred embodiment. The structure of the wireless communication terminals in the present preferred embodiment is the same as in the first preferred embodiment. In addition, the schematic operation when a terminal selected by a user is being authenticated is the same as that shown in FIG. 12.

Figure 19:
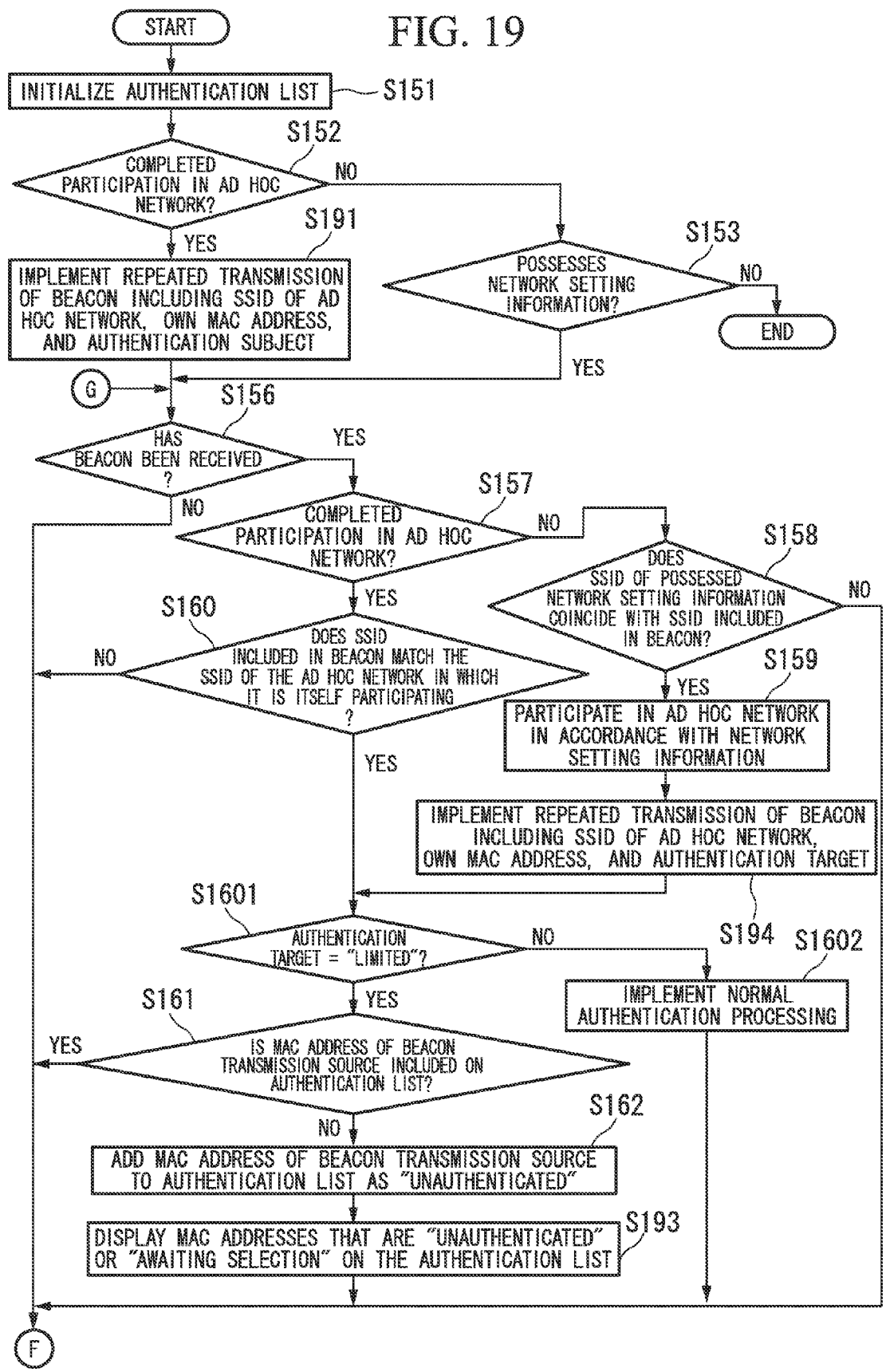
FIG. 19 is a flowchart showing a processing sequence of the wireless communication terminal according to a fourth preferred embodiment of the present invention.
Figure 20:
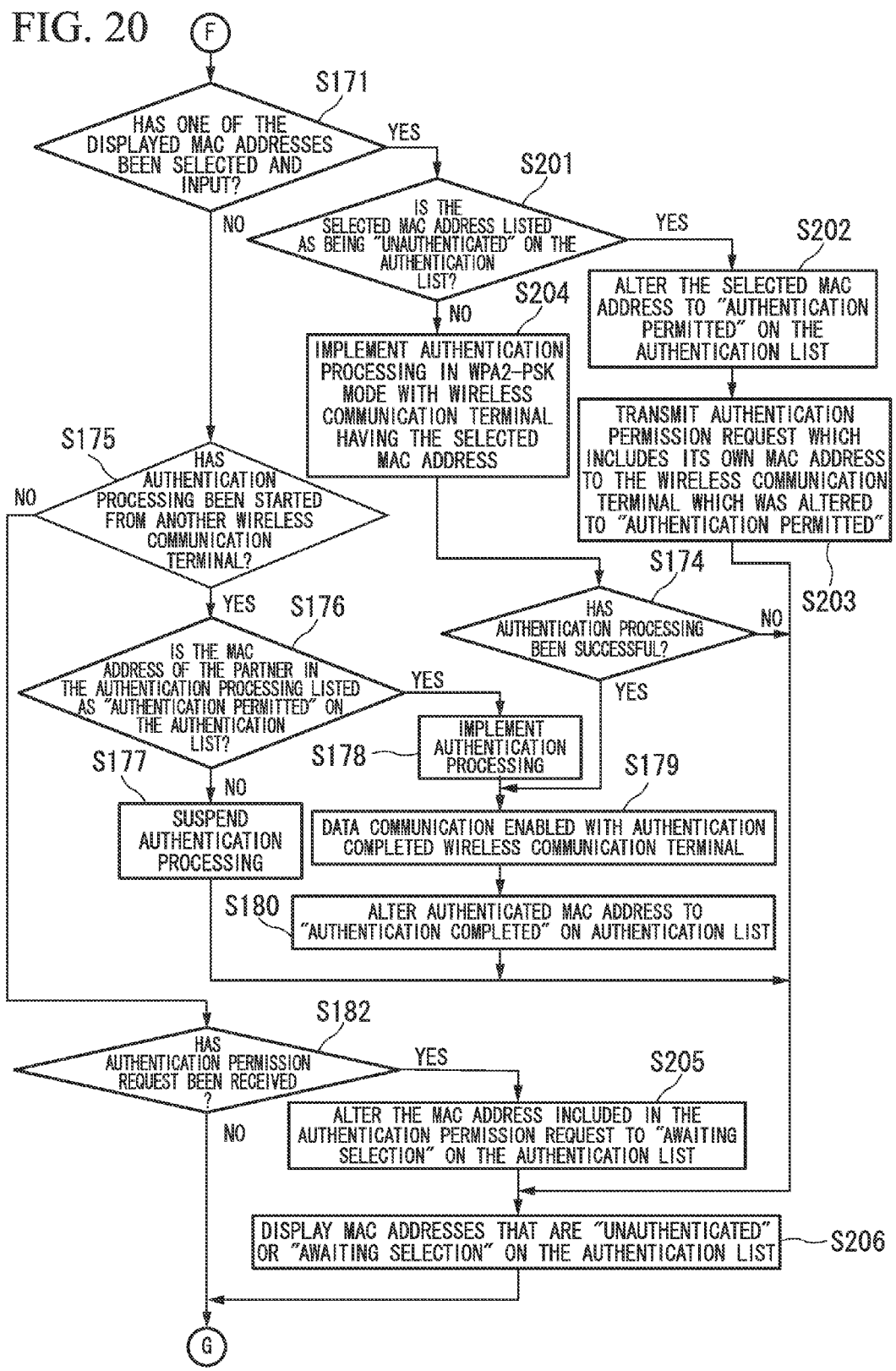
FIG. 20 is a flowchart showing a processing sequence of the wireless communication terminal according to a fourth preferred embodiment of the present invention.

FIG. 19 and FIG. 20 show operations of a wireless communication terminal and are variants of FIG. 13 and FIG. 14. The processing shown in FIG. 19 and FIG. 20 will now be described. In FIG. 19 and FIG. 20, the same symbols are used for steps that are the same as those shown in FIG. 13 and FIG. 14 and any description of these steps is omitted.

If, in step S152, its own wireless communication terminal has completed participation in an ad hoc network, the authentication control unit 10d reads from the storage unit 14 the SSID of that ad hoc network and the MAC address of its own wireless communication terminal, and controls the communication unit 11 such that it repeatedly transmits a Beacon which includes that SSID and MAC address and also notification information stating that the authentication subject ="limited" (step S191). Authentication subject="limited" refers to contents which show that the wireless communication terminal which is the source of the Beacon transmission is limiting the authentication subject within the ad hoc network, namely, which show that the authentication processing is not being performed free of any preconditions.

Continuing from step S159, the authentication control unit 10d then reads from the storage unit 14 the SSID of the ad hoc network in which it is itself participating and the MAC address of its own wireless communication terminal, and controls the communication unit 11 such that it repeatedly transmits a Beacon which includes this SSID and MAC address and also includes this authentication subject="limited" (step S194). Next, the authentication control unit 10d determines whether or not the authentication subject within the Beacon whose reception was confirmed in step S156 is "limited" (step S1601).

If the authentication subject within the Beacon is not "limited", normal authentication processing is implemented (step S1602). Normal authentication processing refers to processing in which, as is shown in Non-patent document 1, when a wireless communication terminal participates in a new network, it performs authentication processing with all of the wireless communication terminals already participating in that network. Next, the routine moves to step S171. If, however, the authentication subject within the Beacon is "limited", the routine moves to step S161. In this case, a function whereby its own wireless communication terminal performs authentication processing exclusively with a selected wireless communication terminal becomes valid.

In the present preferred embodiment, the state information applied to the MAC addresses within the authentication list includes "unauthenticated" and "authentication permitted", as well as "awaiting selection". Continuing on from step S 162, the selection unit 10c reads the authentication list from the storage unit 14, and selects MAC addresses whose state information is listed as being "unauthenticated" and MAC addresses whose state information is listed as being "awaiting selection", and displays those MAC addresses on the display unit 13 (step S193).

If any of the MAC addresses displayed on the display unit 13 is selected in step S171, the authentication control unit 10d determines whether or not the state information associated with the selected MAC address on the authentication list stored in the storage unit 14 is listed as "unauthenticated" (step S201). If the state information is not listed as "unauthenticated", the authentication control unit 10d controls the authentication unit 10b such that it performs authentication processing in WPA2-PSK between itself and the wireless communication terminal having the selected MAC address (step S204).

Because MAC addresses whose state information is listed as "authentication completed" or "authentication permitted" are not displayed on the display unit 13, those MAC addresses are not selected in step S171. Accordingly, if the state information is not listed as "unauthenticated" in step S201, then it is listed as "awaiting selection".

As a result of the processing of step S204, the authentication unit 10b performs authentication processing between itself and its communication partner wireless communication terminal via the communication unit 11. At this time, the selection unit 10c reads the MAC address selected in step S171 from the authentication list, and the authentication control unit 10d controls the authentication unit 10b such that it performs authentication processing with the wireless communication terminal having the read MAC address, and prohibits authentication processing with other wireless communication terminals. The routine then moves to step S174.

If, on the other hand, the state information is listed as "unauthenticated" in step S201, the authentication control unit 10d alters the state information which corresponds to the same MAC address as the selected MAC address in the authentication list stored in the storage unit 14 so that it now reads as "authentication permitted" (step S202). Next, the authentication control unit 10d transmits via the communication unit 11 an authentication permission request which includes the MAC address of its own wireless communication terminal to the wireless communication terminal having the MAC address whose state information was altered to "authentication permitted" in step S202 (step S203). The routine then moves to step S206.

If an authentication permission request is received in step S182, the authentication control unit 10d alters the state information which corresponds to the same MAC address as the MAC address included in the authentication permission request to "awaiting selection" in the authentication list stored in the storage unit 14 (step S205). Next, the selection unit 10c reads the authentication list from the storage unit 14, and selects MAC addresses whose state information is listed as "unauthenticated" and MAC addresses whose state information is listed as "awaiting selection", and displays those MAC addresses on the display unit 13 (step S206). The routine then moves to step S156.

In the above described operation, when the MAC address of an unauthenticated wireless communication terminal which is displayed on the display unit 13 is selected by a user (step S171), an authentication permission request is transmitted to that wireless communication terminal prior to the authentication processing being implemented (step S203). In the wireless communication terminal which received the authentication permission request, the MAC address of the wireless communication terminal which is the source of the authentication permission request transmission is altered on the authentication list so that it reads "awaiting selection" (step S205), and is displayed on the display unit 13 (step S206). When this MAC address is selected by a user (step S171), because the state information corresponding to this MAC address is listed as "awaiting selection" (step S201), authentication processing is implemented with the wireless communication terminal which is the source of the authentication permission request transmission (step S204).

In the third preferred embodiment, an authentication permission request is only transmitted once authentication processing has failed, however, in the present preferred embodiment, the authentication permission request is transmitted before the authentication processing is implemented. Because of this, it is possible to reduce failures in the authentication processing.

Figure 21:
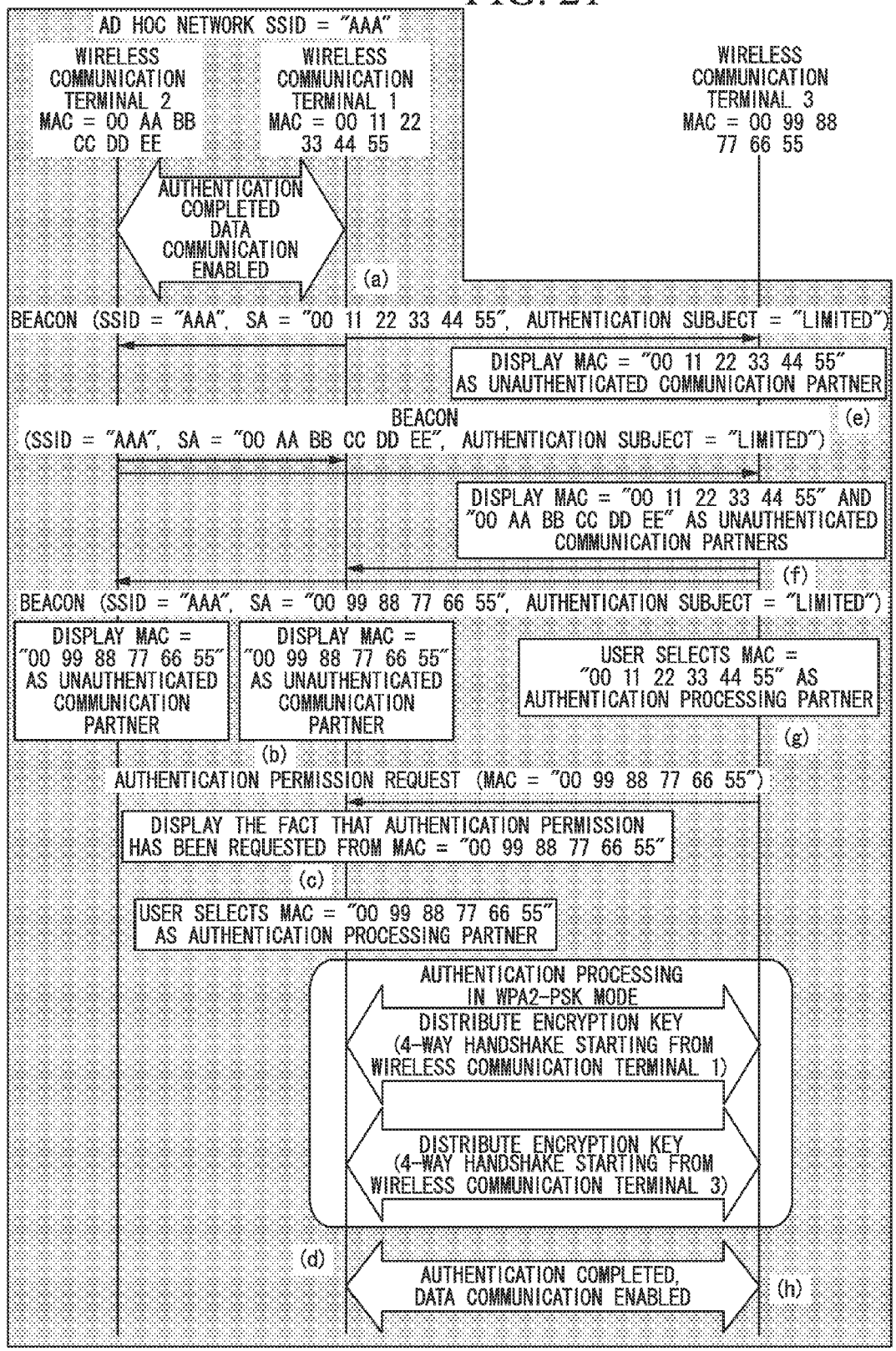
FIG. 21 is a sequence showing a communication procedure between wireless communication terminals according to the fourth preferred embodiment of the present invention.

FIG. 21 shows an example of operations performed in accordance with the routine of FIG. 19 and FIG. 20 which correspond to FIG. 12. Because a large number of portions are similar to FIG. 18, the following description will center on points of variance with FIG. 18. FIG. 20 shows an example of the contents of an authentication list stored in a wireless communication terminal, in the following description will refer to FIG. 22 as is appropriate.

Figure 22:
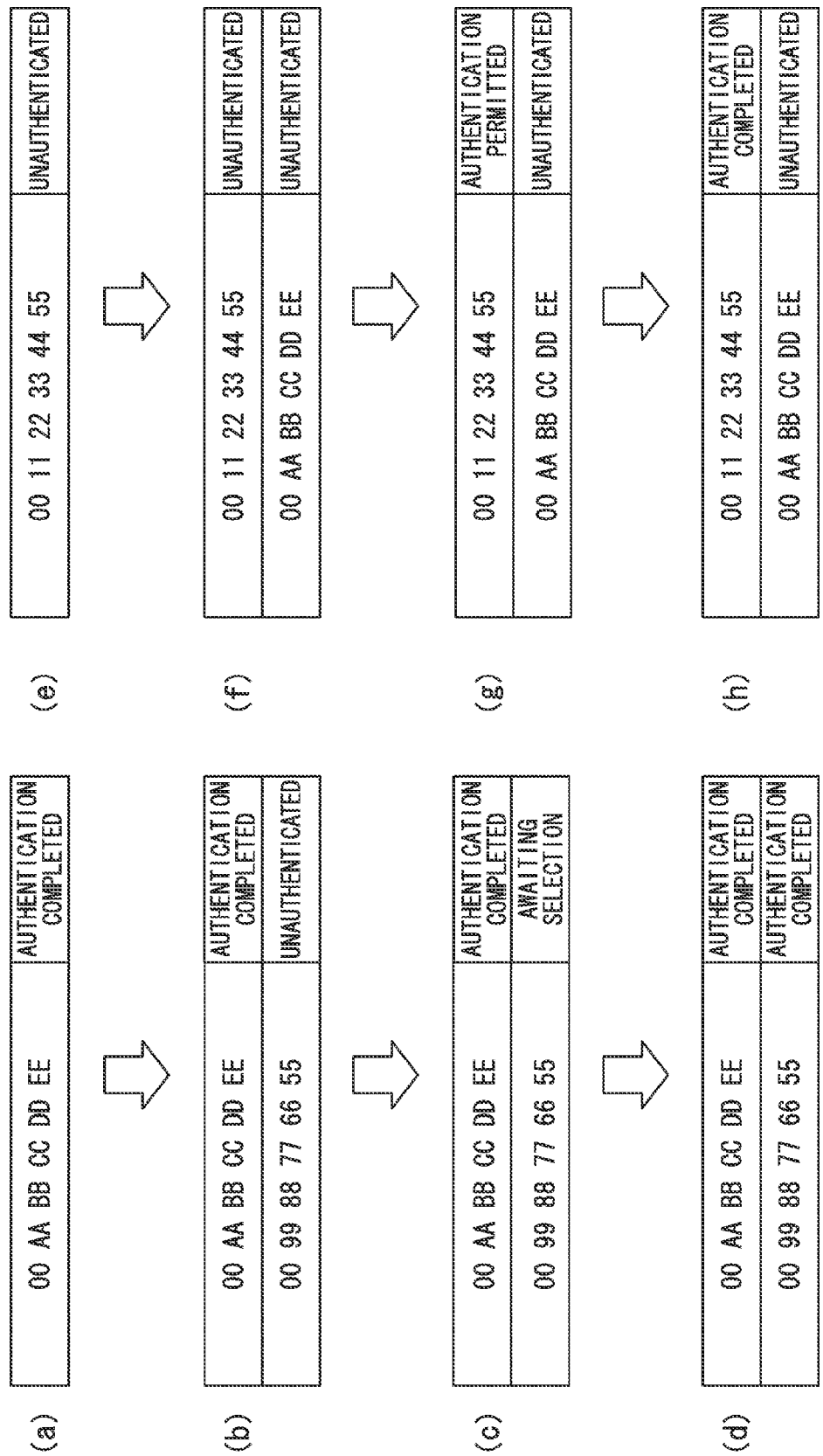
FIG. 22 is a reference diagram showing the contents of an authentication list according to the fourth preferred embodiment of the present invention.

As is shown in FIG. 22, in the authentication list, the MAC addresses of other wireless communication terminals that are present within an ad hoc network in which the wireless communication terminal possessing this particular authentication list is participating and that have been recognized by the Beacons they have transmitted are associated with state information which shows the authentication state corresponding to those MAC addresses.

"Authentication completed" shows a state in which authentication has been completed between its own wireless communication terminal and that particular wireless communication terminal. "Authentication permitted" shows a state in which authentication has not been completed between its own wireless communication terminal and that particular wireless communication terminal, however, the user has completed their selection and if authentication processing is performed from the wireless communication terminal having that MAC address, then that authentication can be completed. "Unauthenticated" shows a state in which authentication has not been completed between its own wireless communication terminal and that particular wireless communication terminal, and authentication processing cannot be performed. The respective contents in the authentication list described in FIG. 22 are described in detail in the description of FIG. 21.

The wireless communication terminal 1 and the wireless communication terminal 2 are already operating in accordance with FIG. 19 and FIG. 20, and are repeatedly transmitting a Beacon which includes the SSID ("AAA") of the ad hoc network, and which also includes as an SA (i.e., source address) its own MAC addresses ("00 11 22 33 44 55" in the case of the wireless communication terminal 1, and "00 AA BB CC DD EE" in the case of the wireless communication terminal 2), and which also includes notification information stating that the authentication subject="limited". Moreover, the wireless communication terminal 1 and the wireless communication terminal 2 are in a state in which they have both completed their mutual authentication of each other, and the authentication of each other's MAC addresses on the authentication list stored in each one has been completed (i.e., the state shown in FIG. 22 (a) in the wireless communication terminal 1), and they are assumed to be operating within a loop governed by the determinations in steps S156, S171, S175, and S182 in FIG. 19 and FIG. 20.

The wireless communication terminal 2 receives a Beacon transmitted from the wireless communication terminal 1 (corresponding to step S156). The wireless communication terminal 2 itself has completed participation in the ad hoc network (corresponding to step S157), and the SSID contained within the Beacon and the SSID of the ad hoc network in which it is itself participating are the same "AAA" (corresponding to step S160). In addition, the authentication subject contained in the Beacon is "limited" (corresponding to step S1601), and the MAC address "00 11 22 33 44 55" of the wireless communication terminal 1 is included on the authentication list (corresponding to step S161).

The wireless communication terminal 3 receives a Beacon transmitted from the wireless communication terminal 1 (corresponding to step S156). Because the wireless communication terminal 3 is not itself participating in the ad hoc network (corresponding to step S157), and because the SSID of the network setting information which it possesses itself and the SSID included in the Beacon are both the same, namely, "AAA" (corresponding to step S158), it participates in an ad hoc network in accordance with the network setting information (corresponding to step S159). In addition, the wireless communication terminal 3 repeatedly transmits a Beacon which includes the SSID ("AAA") of the ad hoc network, and which also includes as the SA (source address) its own MAC address "00 99 88 77 66 55", and which also includes the fact that the authentication subject="limited" (corresponding to step S194).

Because the authentication subject contained in the received Beacon is "limited" (corresponding to step S1601), and because the MAC address "00 11 22 33 44 55" of the wireless communication terminal 1 which is the transmission source of the Beacon is not included on the authentication list (corresponding to step S161), the wireless communication terminal 3 adds that MAC address "00 11 22 33 44 55" to the authentication list as an unauthenticated address (corresponding to step S162). The authentication list of the wireless communication terminal 3 at this time is in the state shown in FIG. 22 (e). At this point, because there are no MAC addresses awaiting selection and only the MAC address "00 11 22 33 44 55" is unauthenticated on the authentication list of the wireless communication terminal 3, the wireless communication terminal 3 displays this MAC address on the display unit 13 (corresponding to step S193).

The wireless communication terminal 1 receives, the Beacon transmitted from the wireless communication terminal 2 (corresponding to step S156). The wireless communication terminal 1 has itself completed participation in the ad hoc network (corresponding to step S157), and the SSID of the Beacon and the SSID of the ad hoc network in which it is itself participating are both the same, namely, "AAA" (corresponding to step S160). In addition, the authentication subject contained in the Beacon is "limited" (corresponding to step S1601), and the MAC address "00 AA BB CC DD EE" of the wireless communication terminal 2 is included on the authentication list (corresponding to step S161).

The wireless communication terminal 3 receives the Beacon transmitted from the wireless communication terminal 2 (corresponding to step S156). The wireless communication terminal 3 has itself completed participation in the ad hoc network (corresponding to step S157), and the SSID of the Beacon and the SSID of the ad hoc network in which it is itself participating are both the same, namely, "AAA" (corresponding to step S160). Furthermore, because the authentication subject contained in the Beacon is "limited" (corresponding to step S1601), and because the MAC address "00 AA BB CC DD EE" of the wireless communication terminal 2 which is the source of the Beacon transmission is not included on the authentication list (corresponding to step S161), the wireless communication terminal 3 adds this MAC address "00 AA BB CC DD EP." to the authentication list as an unauthenticated address (corresponding to step S162). The authentication list of the wireless communication terminal 3 at this time is in the state shown in FIG. 20 (f). At this point, because there are no MAC addresses awaiting selection and only the MAC addresses "00 11 22 33 44 55" and "00 AA BB CC DD EE" are unauthenticated on the authentication list of the wireless communication terminal 3, the wireless communication terminal 3 displays these MAC addresses on the display unit 13 (corresponding to step S193).

The wireless communication terminal 1 and the wireless communication terminal 2 receive a Beacon transmitted from the wireless communication terminal 3 (corresponding to step S156). The wireless communication terminal 1 and the wireless communication terminal 2 have themselves completed participation in the ad hoc network (corresponding to step S157); and the SSID of the Beacon and the SSID of the ad hoc network in which they are themselves participating are both the same, namely, "AAA" (corresponding to step S160). Furthermore, because the authentication subject contained in the Beacon is "limited" (corresponding to step S1601), and because the MAC address "00 99 88 77 66 55" of the wireless communication terminal 3 is not included on the authentication list (corresponding to step S161), the wireless communication terminal 1 and the wireless communication terminal 2 add this MAC address "00 99 88 77 66 55" as an unauthenticated address to the authentication list (corresponding to step S162). The authentication list of the wireless communication terminal 1 at this time is in the state shown in FIG. 22 (b). At this point, because there are no MAC addresses awaiting selection and only the MAC address "00 99'88 77 66 55" is unauthenticated on the authentication lists of the wireless communication terminal 1 and the wireless communication terminal 2, the wireless communication terminal 1 and the wireless communication terminal 2 display this MAC address on the display unit 13 (corresponding to step S193).

Thereafter, when the user operates the operating unit 12 of the wireless communication terminal 3 and selects the displayed MAC address "00 11 22 33 44 55" (corresponding to step S171), because the MAC address "00 11 22 33 44 55" is listed as "unauthenticated" on the authentication list (corresponding to step S201), the wireless communication terminal 3 alters this to "authentication permitted" (corresponding to step S202). Furthermore, the wireless communication terminal 3 transmits an authentication permission request which includes its own MAC address "00 99 88 77 66 55" to the wireless communication terminal 1 having the MAC address "00 11 22 33 44 55" (corresponding to step S203). The authentication list of the wireless communication terminal 3 at this time is in the state shown in FIG. 22 (g).

When the wireless communication terminal 1 receives the authentication permission request (corresponding to step S182), it alters the MAC address "00 99 88 77 66 55" included in the authentication permission request from "unauthenticated" to "awaiting selection" on the authentication list (corresponding to step S205). The authentication list of the wireless communication terminal 1 at this time is in the state shown in FIG. 22 (c). At this point, because there are no unauthenticated MAC addresses and only the MAC address "00 99 88 77 66 55" is awaiting selection on the authentication list of the wireless communication terminal 1, the wireless communication terminal 1 displays this MAC address on the display unit 13 (corresponding to step S206).

Thereafter, when the user operates the operating unit 12 of the wireless communication terminal 1 and selects the displayed MAC address "00 99 88 77 66 55" (corresponding to step S171), because the MAC address "00 99 88 77 66 55" is not listed as "unauthenticated", but as "awaiting selection" on the authentication list of the wireless communication, terminal 1 (corresponding to step S201), the wireless communication terminal 1 implements authentication processing in WPA2-PSK between itself and the wireless communication terminal 3 which has the MAC address "00 99 88 77 66 55" (corresponding to step S204).

The authentication processing in WPA2-PSK is started from the wireless communication terminal 1 (corresponding to step S175), and because the MAC address "00 11 22 33 44 55" of the wireless communication terminal I is listed as being "authentication permitted" on the authentication list of the wireless communication terminal 3 (corresponding to step S176), the wireless communication terminal 3 implements authentication processing in WPA2-PSK between itself and the wireless communication terminal 1 (corresponding to step S178).

The wireless communication terminal I then determines that the authentication processing between itself and the wireless communication terminal 3 has been successful (corresponding to step S174), and data communication between these two is enabled (corresponding to step S179). The wireless communication terminal 1 alters the MAC address "00 99 88 77 66 55" of the wireless communication terminal 3 whose authentication has been successful on the authentication list from "authentication permitted" to "authentication completed" (corresponding to step S180). The authentication list of the wireless communication terminal 1 at this time is in the state shown in FIG. 22 (d), and because no unauthenticated MAC address is listed thereon, the wireless communication terminal 1 does not display any MAC addresses (corresponding to step S184).

The wireless communication terminal 3 is now able to perform data communication between itself and the wireless communication terminal 1 (corresponding to step S179). The wireless communication terminal 3 then alters the MAC address "00 11 22 33 44 55" of the wireless communication terminal 1 whose authentication has been successful on the authentication list from "authentication permitted" to "authentication completed" (corresponding to step S180). The authentication list of the wireless communication terminal 3 at this time is in the state shown in FIG. 22 (h). The wireless communication terminal 3 only displays the unauthenticated MAC address "00 AA BB CC DD EE" on the display unit 13 (corresponding to step S184).

As has been described above, according to the present preferred embodiment, it is possible for a wireless communication terminal to perform data communication exclusively with the limited number of the wireless communication terminals that it has itself selected, and a user is able to select a wireless communication terminal to be the subject of authentication processing. In addition, by transmitting an authentication permission request (i.e., an authentication request) before authentication processing is implemented, it is possible to reduce failures in the authentication processing.

While preferred embodiments of the present invention have been described and illustrated above, it should be understood that these are exemplary of the invention and are not to be considered as limiting. Additions, omissions, substitutions, and other modifications can be made without departing from the scope of the present invention.

What is claimed is:

1. A wireless communication terminal comprising:
an operating unit that receives an operation by a user;
an authentication unit that performs authentication at a data link level for other wireless communication terminals participating in a same ad hoc network as an ad hoc network in which its own wireless communication terminal is participated;
a communication unit that performs data communication with the authenticated other wireless communication terminals;

and
an authentication control unit that, when receiving a presence notification information announcing the presence of other wireless communication terminals, a participation request to the ad hoc network, or a response to the participation request to the ad hoc network from an other wireless communication terminal that has not been authenticated, determines whether or not to perform the authentication by the authentication unit for the other wireless communication terminal that has not been authenticated and has transmitted the presence notification information, the participation request, or the response, wherein after a trigger that starts authentication processing by the operation of the operating unit is generated, when an in-authentication information indicating that the authentication is under processing is not included in the participation request, the response, or the presence notification information including an ID indicating the same ad hoc network in which its own wireless communication terminal is participated, which is transmitted from the other wireless communication terminal that has not yet been authenticated by the authentication unit, the authentication control unit determines not to perform the authentication by the authentication unit for the other wireless communication terminal that has not yet been authenticated and has transmitted the participation request, the response, or the presence notification information including the ID indicating the same ad hoc network in which its own wireless communication terminal is participated, or when through the operation of the operating unit, the other wireless communication terminal to be authenticated is selected from the other wireless communication terminals participating in the same ad hoc network in which its own wireless communication terminal is participated and having not yet been authenticated by the authentication unit, the authentication control unit determines not to perform the authentication by the authentication unit for the other wireless communication terminal that has not been selected by the operating unit; and wherein when it is determined that the authentication is performed, or the authentication is made from the other wireless communication terminal, the authentication control unit performs control so that the presence notification information, the participation request, or the response is transmitted without including the in-authentication information.

2. The wireless communication terminal according to claim 1, wherein if there is no participation in any of the ad hoc networks, the authentication unit performs the determination only after generating an ad hoc network or after participating in an ad hoc network generated by the other wireless communication terminal further comprising:

a storage unit that stores first identification information that identifies terminals, which have not been authenticated, from among recognized terminals that are capable of performing wireless communication, and wherein if an authentication request is received from a terminal that is located in the vicinity of the authentication control unit and that is capable of performing wireless communication, and the authentication request includes second identification information about the terminal, then the authentication control unit determines whether or not the terminal has been authenticated based on the first identification information and on the second identification information as well, and if it is determined that the terminal has not been authenticated, then the selection unit selects the terminal.

3. The wireless communication terminal according to claim 1, wherein if the trigger is generated by the operation of the operating unit, the authentication control unit performs control so that the presence notification information, the participation request, or the response is transmitted while including the in-authentication information.

4. The wireless communication terminal according to claim 1, further comprising:

a storage unit that, when the trigger has not yet been generated by the operation of the operating unit, if the presence notification information including an ID indicating the same ad hoc network in which its own wireless communication terminal is participated, and the in-authentication information are received from the other wireless communication terminal, stores terminal information relating to the other wireless communication terminal, wherein only if the authentication processing of its own wireless communication terminal starts by the other wireless communication terminal after the trigger is generated by the operation of the operating unit and the terminal information corresponding to the other wireless communication terminal by which the authentication processing of its own wireless communication terminal is started is stored in the storage unit, the authentication control unit determines to perform the authentication of the other wireless communication terminal by which the authentication processing of its own wireless communication terminal is started.

5. The wireless communication terminal according to claim 1, further comprising:

a display unit that displays the other wireless communication terminal which participates in the same ad hoc network and has not yet been authenticated by the authentication unit.

6. The wireless communication terminal according to claim 5, wherein if an authentication request is performed by the other wireless communication terminal which participates in the same ad hoc network, the display unit displays so as to identify the other wireless communication terminal which has performed the authentication request and the other wireless communication terminal which has not performed the authentication request.

7. The wireless communication terminal according to claim 5, wherein the authentication control unit performs control so as to transmit the authentication request encouraging to authenticate its own wireless communication terminal, to the other wireless communication terminal selected by the operating unit.

8. A connection setup method for a wireless communication terminal, comprising:

receiving an operation by a user at an operating unit;

performing authentication using an authentication unit at a data link level for other wireless communication terminals participating in a same ad hoc network as an ad hoc network in which its own wireless communication terminal is participated;

performing data communication using a communication unit that performs data communication with the authenticated other wireless communication terminals;

determining using an authentication control unit whether or not to perform the authentication by the authentication unit for an other wireless communication terminal that has not been authenticated and has transmitted the presence notification information, the participation request, or the response, upon receiving a presence notification information announcing the presence of other wireless communication terminals, a participation request to the ad hoc network or a response to the participation request to the ad hoc network from the other wireless communication terminal that has not been authenticated; and determining using the authentication control unit:

when an in-authentication information indicating that the authentication is under processing is not included in the participation request, the response, or the presence notification information including an ID indicating the same ad hoc network in which its own wireless communication terminal is participated, which is transmitted from the other wireless communication terminal that has not yet been authenticated by the authentication unit, not to perform the authentication by the authentication unit for the other wireless communication terminal that has not yet been authenticated and has transmitted the participation request, the response, or the presence notification information including the ID indicating the same ad hoc network in which its own wireless communication terminal is participated, after a trigger that starts authentication processing by the operation of the operating unit is generated, or when through the operation of the operating unit, the other wireless communication terminal to be authenticated is selected from the other wireless communication terminals participating in the same ad hoc network in which its own wireless communication terminal is participated and having not yet been authenticated by the authentication unit, not to perform the authentication by the authentication unit for the other wireless communication terminal that has not been selected by the operating unit; and when it is determined that authentication is performed, or the authentication is made from the other wireless communication terminal, the authentication control unit performs control so that the presence notification information, the participation request, or the response is transmitted without including the in-authentication information.

* * * * *